US005573090A

United States Patent [19]
Ross

[11] Patent Number: 5,573,090
[45] Date of Patent: Nov. 12, 1996

[54] ROADWAY-POWERED ELECTRIC VEHICLE SYSTEM HAVING ONBOARD POWER METERING AND COMMUNICATION CHANNEL FEATURES

[75] Inventor: Howard R. Ross, Richmond, Calif.

[73] Assignee: H. R. Ross Industries, Inc., Richmond, Calif.

[21] Appl. No.: 238,826

[22] Filed: May 5, 1994

[51] Int. Cl.[6] .............................. B60L 11/16; B60L 9/02
[52] U.S. Cl. ................................. 191/10; 320/2; 180/2.1
[58] Field of Search ...................... 191/2, 3, 4, 5, 191/6, 7, 10; 180/165, 2.1; 320/2; 307/9.1, 10.1; 246/187 R, 187 A, 187 B, 187 C

[56] References Cited

U.S. PATENT DOCUMENTS

| Re. 29,994 | 5/1979 | Bossi | 191/2 |
|---|---|---|---|
| 2,589,453 | 3/1952 | Storsand. | |
| 3,673,379 | 6/1972 | Eversuil | 219/202 |
| 3,914,562 | 10/1975 | Bolger | 191/10 |
| 3,938,018 | 2/1976 | Dahl | 320/2 |
| 4,007,817 | 2/1977 | Bolger | 191/10 |
| 4,031,449 | 6/1977 | Trombly | 320/2 |
| 4,158,802 | 6/1979 | Rose | 320/2 |
| 4,218,624 | 8/1980 | Schievone | 290/45 |

(List continued on next page.)

FOREIGN PATENT DOCUMENTS

| 0253345 | 1/1988 | European Pat. Off. . | |
| 0289868 | 11/1988 | European Pat. Off. . | |
| 2387138 | 11/1978 | France . | |
| 2161266 | 6/1973 | Germany . | |
| 2740438 | 3/1979 | Germany | 191/4 |
| 4115568 | 2/1993 | Germany | 191/10 |
| 4124800 | 4/1992 | Japan . | |
| 4271201 | 9/1992 | Japan . | |
| 6-6903 | 2/1993 | Japan | 191/10 |
| 2020451 | 11/1979 | United Kingdom . | |
| 2191620 | 12/1987 | United Kingdom . | |

OTHER PUBLICATIONS

Behrin, et al., "Energy Storage Systems for Automobile Propulsion: 1978 Study", *Lawrence Livermore Laboratory*, 2. *Detailed Report*, UCRL-52553, vol. 2, pp. 1-19 through 1-38 (Dec. 15, 1978).

Michael J. Riezenman, Senior Editor, "Special Report, Electric Vehicles", *IEEE Spectrum*, pp. 18-24 and 93-101, (Nov. 1992).

(List continued on next page.)

*Primary Examiner*—Karen B. Merritt
*Assistant Examiner*—Scott L. Lowe
*Attorney, Agent, or Firm*—Fitch, Even, Tabin & Flannery

[57] ABSTRACT

A roadway-powered electric vehicle (RPEV) system includes: (1) an all-electric vehicle; and (2) a roadway network over which the vehicle travels. The all-electric vehicle has one or more onboard energy storage elements or devices that can be rapidly charged or energized with energy obtained from an electrical current, such as a network of electromechanical batteries. The electric vehicle further includes an on-board controller that extracts energy from the energy storage elements, as needed, and converts such extracted energy to electrical power used to propel the electric vehicle. The energy storage elements may be charged while the vehicle is in operation. The charging occurs through a network of power coupling elements, e.g., coils, embedded in the roadway. The RPEV system also includes: (1) an onboard power meter; (2) a wide bandwidth communication channel to allow information signals to be sent to, and received from, the RPEV while it is in use; (3) automated garaging that couples power to the RPEV for both replenishing the onboard energy source and to bring the interior climate of the vehicle to a comfortable level before the driver and/or passengers get in; (4) electronic coupling between "master" and "slave" RPEV's in order to increase passenger capacity; (5) inductive heating coils at passenger loading/unloading zones in order to increase passenger safety; and (6) an ergonomically designed passenger compartment.

18 Claims, 16 Drawing Sheets

U.S. PATENT DOCUMENTS

| | | | |
|---|---|---|---|
| 4,218,889 | 8/1980 | Buell | 60/676 |
| 4,236,594 | 12/1980 | Ramsperger | 180/167 |
| 4,254,843 | 3/1981 | Han et al. | 180/165 |
| 4,331,225 | 5/1982 | Bolger | 191/10 |
| 4,347,472 | 8/1982 | Lemelson | 320/2 |
| 4,350,287 | 9/1982 | Richards | 237/12.3 |
| 4,484,083 | 11/1984 | Jefferies | 290/45 |
| 4,495,836 | 1/1985 | Cohen | 74/751 |
| 4,583,505 | 4/1986 | Frank et al. | 123/198 |
| 4,588,040 | 5/1986 | Albright et al. | 180/165 |
| 4,629,947 | 12/1986 | Hammerslag et al. | 318/161 |
| 4,742,283 | 5/1988 | Bolger et al. | 318/587 |
| 4,800,328 | 1/1989 | Bolger et al. | 320/2 |
| 4,836,344 | 6/1989 | Bolger | 191/10 |
| 4,893,240 | 1/1990 | Karkouti | 364/424 |
| 5,000,139 | 3/1991 | Wong | 123/779 B |
| 5,049,802 | 9/1991 | Mintus et al. | 320/2 |
| 5,055,851 | 10/1991 | Sheffer | 342/457 |
| 5,113,427 | 5/1992 | Ryoichi et al. | 379/57 |
| 5,129,376 | 7/1992 | Parmley | 123/179.2 |
| 5,198,811 | 3/1993 | Potter et al. | 340/905 |
| 5,207,304 | 5/1993 | Lechner et al. | 191/10 |
| 5,244,054 | 9/1993 | Parry | 180/165 |
| 5,293,308 | 3/1994 | Boys et al. | 363/37 |
| 5,311,973 | 5/1994 | Tseng et al. | 191/10 |

OTHER PUBLICATIONS

Dave Dooling, Contributing Editor, "Technology 1993, Transportation", *IEEE Spectrum*, pp. 68–71 (Jan. 1993).

Post, et al., "A High–Efficiency Electromechanical Battery", *Proceedings of the IEEE*, vol. 81:3; pp. 462–474 (Mar. 1993).

Post, et al., "Electromechanical Battery Research and Development at the Lawrence Livermore National Laboratory", *26th International Symposium on Automotive Technology and Automation*, Aachen, Germany, pp. 1–9, (Sep. 13–17, 1993).

Ashley, "Flywheels Put a New Spin on Electric Vehicles", *Mechanical Engineering*, pp. 44–51 (Oct. 1993).

Brobeck, "Design Study for a Flywheel–Electric Car", *Conference Record of 28th IEEE Vehicular Technology Conference*, pp. 145–152 (Mar. 22, 1978, New York).

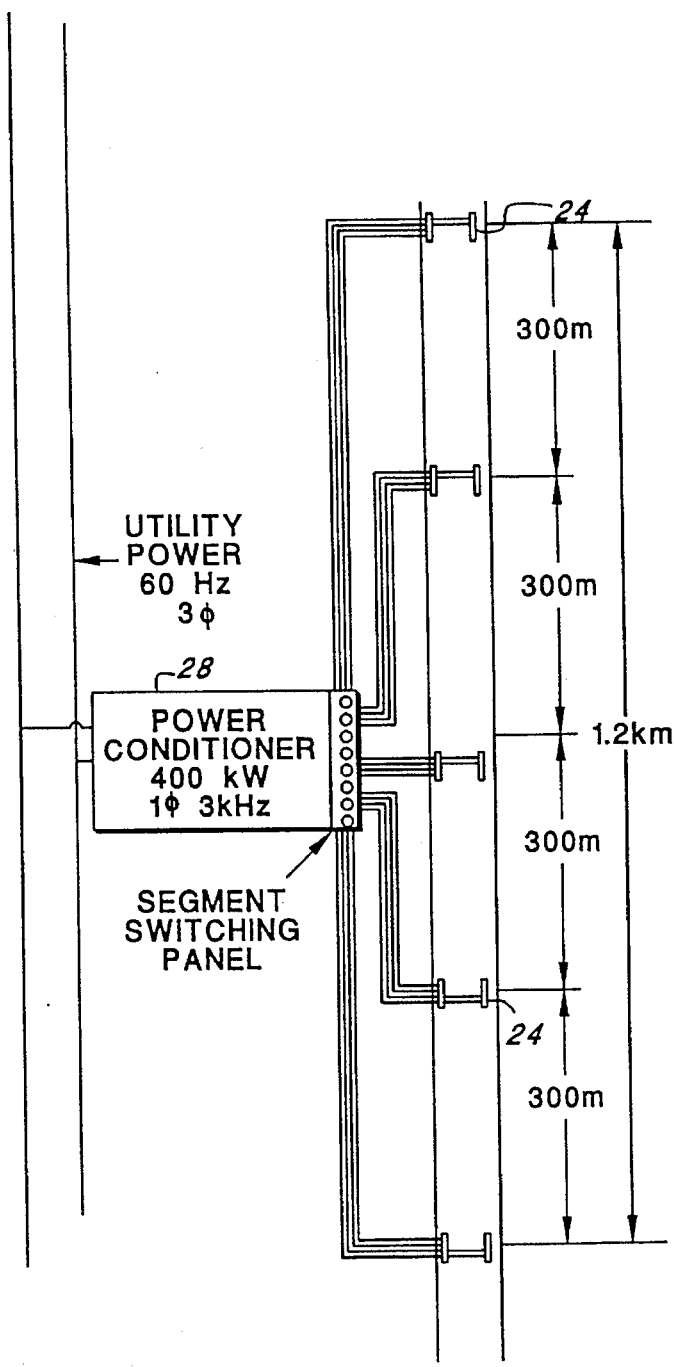
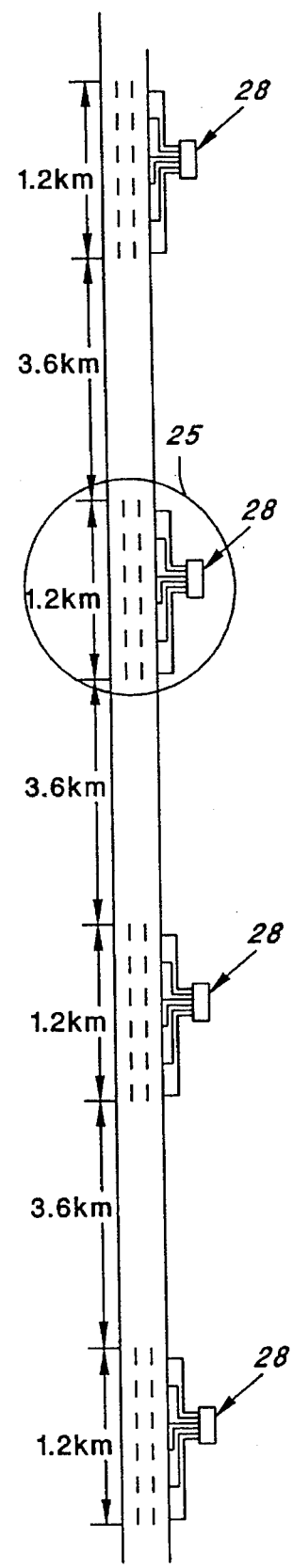
FIG. 6D
FIG. 6C

ROADWAY-POWERED ELECTRIC VEHICLE SYSTEM HAVING ONBOARD POWER METERING AND COMMUNICATION CHANNEL FEATURES

BACKGROUND OF THE INVENTION

The present invention relates to electric vehicles, and more particularly to an all-electric vehicle system that is powered from an onboard electromechanical battery (EMB), or other equivalent high specific power energy-storage device, and that receives power to charge the EMB inductively through coils strategically embedded in the roadway over which the vehicle travels. The invention further relates to enhancements included within such a roadway-powered electric vehicle system, such as an onboard metering device, a communication channel, and the like.

In recent years, there has been an increasing emphasis on the development of an all electric vehicle (EV). The goal, as mandated by many governmental jurisdictions, is to have a certain percentage of all vehicles be zero-emission vehicles. Advantageously, zero-emission vehicles do not directly emit any exhaust or other gases into the air, and thus do no pollute the atmosphere. In contrast, vehicles that rely upon an internal combustion engine (ICE), in whole or in part, for their power source are continually fouling the air with their exhaust emissions. Such fouling is readily seen by the visible "smog" that hangs over heavily populated urban areas. Zero-emission vehicles are thus viewed as one way to significantly improve the cleanliness of the atmosphere.

In the State of California, for example, the California Air Resources Board (CARB) has mandated that by 1998 two percent of the vehicles lighter than 1700 kg sold by each manufacturer in the state be zero-emission vehicles. This percentage must increase to five percent by the year 2001, and ten percent by the year 2003.

A zero-emission vehicle, given the known, viable technologies for vehicle propulsion, effectively means that such vehicles must be all electric, or EV's. Hence, if existing (and future) governmental mandates are to be met, there is an urgent need in the art for a viable EV that can operate efficiently and safely.

EV's are not new. They have existed in one form or another since the discovery of electrical batteries and electric motors. In general, EV's of the prior art are of one of two types: (1) those that—through rail or overhead wire—are in constant contact with an external source of electrical power (hereafter "externally-powered EV's"); or (2) those that store electrical energy in a battery and then replenish the stored energy when needed (hereafter "rechargeable battery-driven EV's").

Externally-powered EV's require their own power delivery system, e.g., electrified rails or electrified overhead wires, that forms an integral part of their own roadway or route network. Examples of externally powered EV's are subways, overhead trolley systems, and electric rails (trains). Such externally-powered EV systems are in widespread use today as public transportation systems in most large metropolitan areas. However, such systems typically require their own roadway, or right-of-way, system, as well as the need for a continuously electrified rail or overhead wire with which the EV remains in constant contact. These requirements make such systems extremely expensive to acquire, build and maintain. Moreover, such externally-powered EV systems are not able to provide the convenience and range of the ICE automobile (which effectively allows its operator to drive anywhere there is a reasonable road on which the ICE vehicle can travel). Hence, while externally-powered EV systems, such as subway, trolley, and electric rail systems, have provided (and will continue to provide) a viable public transportation system, there is still a need in the art for a zero-emission vehicle system that offers the flexibility and convenience of the ICE vehicle, and that is able to take advantage of the vast highway and roadway network already in existence used by ICE vehicles.

Rechargeable battery-driven EV's are characterized by having an electrical energy storage device onboard, e.g., one or more electrochemical batteries, from which electrical energy is withdrawn to provide the power to drive the vehicle. When the energy stored in the batteries is depleted, then the batteries are recharged with new energy. Electrochemical batteries offer the advantage of being easily charged (using an appropriate electrical charging circuit) and readily discharged when powering the vehicle (also using appropriate electrical circuity) without the need for complex mechanical drive trains and gearing systems. Unfortunately, however, such rechargeable battery-driven EV's have not yet proven to be economically viable nor practical. For most vehicle applications, such rechargeable battery-driven EV's have not been able to store sufficient electrical energy to provide the vehicle with adequate range before needing to be recharged, and/or to allow the vehicle to travel at safe highway speeds for a sufficiently long period of time. Disadvantageously, the energy density (the amount of energy that can be stored per unit volume) of currently-existing electrochemical batteries has been inadequate. That is, when sufficient electrical storage capacity is provided on board the vehicle to provide adequate range, the number of batteries required to provide such storage capacity is prohibitively large, both in volume and weight. Moreover, when the battery needs to be recharged, the time required to fully recharge the batteries usually takes hours, not "minutes" as most vehicle operators are accustomed to when they stop to refill their ICE vehicles with fuel. Further, most electrochemical batteries currently used in the art are not suited for numerous, repeated recharges. Hence, such batteries, after a nominal number of recharges, must be replaced with new batteries, thereby significantly adding to the expense of operating the rechargeable battery-driven EV. It is thus evident that what is needed is a rechargeable battery-driven EV that has sufficient energy storage capacity to drive the distances and speeds commonly achieved with ICE vehicles, as well as the ability to be rapidly recharged within a matter of minutes, not hours.

EV systems are known in the art that attempt to combine the best features of the externally-powered EV systems and the rechargeable battery-driven EV systems. For example, rather than use a battery as the energy storage element, it is known in the art to use a mechanical flywheel that is rapidly charged up to a fast speed at select locations along a designated route. See, e.g., U.S. Pat. No. 2,589,453 issued to Storsand, where there is illustrated an EV that includes a mechanical flywheel that is recharged via an electrical connection at a charging station.

Further, in U.S. Pat. No. 4,331,225, issued to Bolger, there is shown an EV that has an electrochemical battery as the preferred storage means, and that receives power from a roadway power supply via inductive coupling. An onboard power control system then provides the power to the storage means, and the storage means then supplies power as needed to an electric motor providing motive power for the vehicle. Bolger also indicates that the storage means could be a mechanical flywheel.

In U.S. Pat. No. 4,388,977, issued to Bader, an electric drive mechanism for vehicles is disclosed that uses a pair of electric motors as motive power for the vehicle. A mechanical flywheel is mechanically connected to the drive shaft of one of the electric motors. The vehicle receives power from an overhead power supply, e.g,. trolley lines, and the motor then spools up the flywheel. The flywheel is then used to supply power to the motor at locations where there is not an overhead power supply.

In U.S. Pat. No. 5,224,054, issued to Parry, there is shown a bus-type vehicle having a continuously variable gear mechanism that uses a flywheel as a power source. The flywheel is periodically charged by an overhead connection to an electrical supply. The flywheel is mechanically linked to the drive shaft of the vehicle.

In the above systems, a mechanical flywheel is used as the energy-storage element because it can be charged, i.e., spooled up, relatively quickly to a sufficiently fast speed. Disadvantageously, however, the use of such mechanical flywheel significantly complicates the drive system of the vehicle, and also significantly adds to the weight of the vehicle, thereby limiting its useful range between charges. Further, a mechanical flywheel operating at fast speeds may present a safety hazard. What is needed, therefore, is an EV that avoids the use of flywheels that are mechanically coupled to the vehicle's drive system. Further, what is needed is an EV that can receive electrical energy from an external source to rapidly recharge, within a matter of minutes, an onboard energy storage element. Moreover, what is needed is such an EV wherein the onboard energy storage element, once charged or recharged, stores sufficient energy to provide the motive force needed to safely drive the vehicle at conventional driving speeds and distances.

SUMMARY OF THE INVENTION

The present invention addresses the above and other needs by providing a roadway-powered electric vehicle system that includes: (1) an all-electric vehicle; and (2) a roadway network over which the vehicle travels. The all-electric vehicle includes one or more onboard energy storage elements or devices that can be rapidly charged or energized with energy obtained from an electrical current. The vehicle further includes an onboard controller that extracts energy from the energy storage elements, as needed, and converts such extracted energy to electrical energy used to propel the electric vehicle. Advantageously, the energy storage elements of the vehicle may be charged while the vehicle is in operation. Such charging occurs, e.g., through a network of power coupling elements embedded in the roadway. As the vehicle passes over such power coupling elements, as it traverses the roadway network, electrical current is coupled to the electric vehicle, which electrical current is then used to charge the energy storage devices. Advantageously, such power coupling elements may be embedded at strategic locations in existing roadways and highways at a very modest cost.

In a preferred embodiment, the power coupling elements embedded in the roadway comprise a network of coils connected to a conventional primary power source, e.g., three-phase 50 or 60 Hz electrical power as is readily available from public utility power companies or cooperatives. Advantageously, such coils need not be distributed along the entire length of the roadway, but need only be located at selected locations along the length of the roadway, e.g., 10% or less of the roadway. An alternating electrical current (ac current) is inductively coupled from the coils embedded in the roadway to coils carried on the vehicle as the vehicle passes over the embedded coils. Such ac current, when received on the vehicle, is then used to charge or energize the storage elements carried by the vehicle.

A power meter, carried onboard the vehicle, monitors how much power is coupled to or used by the vehicle. Hence, the public utility (or other power company) that provides the primary power to the power coupling elements embedded in the roadway (or otherwise located to couple power to the vehicle) is able to charge the vehicle owner an appropriate amount for such power, thereby recouping the cost and expense and generating and delivering such electrical power.

In the preferred embodiment, the rapid charge energy storage elements or devices carried onboard the electric vehicle comprise an electromechanical battery (EMB), or a group or network of EMB modules. An EMB is a special type of energy-storage device having a rotor, mounted for rapid rotation on magnetic bearings in a vacuum-sealed housing. Because magnetic bearings are used, the shaft of the rotor does not physically contact any other components. Hence, there is no friction loss in the bearings. Because the rotor is housed in a sealed, evacuated, chamber, there are no loses due to windage. As a result, the rotor—made from high-strength graphite-fiber/epoxy composite—is able to rotate at extremely high speeds, e.g., 200,000 rpm. At such speeds, high amounts of energy can be stored in a very compact or small volume. Hence, the EMB represents a significant improvement in energy density relative to conventional electrochemical batteries.

In order to store energy in the EMB, and in order to extract energy therefrom, a special dipolar array of high-field permanent magnet material is mounted on the rotor. The resulting magnetic field from such array, extends outside of the sealed housing to cut through stationary, external coils, wound external to the housing. By applying an appropriate ac current to the external coils, the rotor is forced to spin. Because of the compactness and special design of the rotor, it is able to achieve high rotational speeds very rapidly (within minutes). Hence, the EMB may be charged to store a high amount of energy in a very short time, commensurate with the same time it takes to fill the gas tank of existing ICE vehicles.

Advantageously, the rapid charging of the EMB does not require any direct mechanical linkages with the rotor. Rather, the EMB is charged by simply applying an appropriate ac electrical signal to its terminals. Similarly, the EMB is discharged (energy is withdrawn therefrom) by simply using it as a generator, i.e., connecting its electrical terminals to a suitable load through which an electrical current may flow. Thus, the complexity of the charging components and the discharging components is greatly simplified, and the EMB appears, from an electrical point-of-view, as a "battery", having an electrical input and an electrical output.

In operation, the input ac voltage applied to the terminals of the EMB spools up the rotor of the EMB to a rate proportional to the frequency of the applied ac voltage, just as if the EMB were an ac motor. The energy stored in the EMB is in the form of kinetic energy associated with the rapid rotation of the rotor. When extracting energy, the rapid rotating magnetic field, created by the rapid rotation of the magnetic array on the rotor, cuts through the stationary windings, inducing an ac voltage, just as though the EMB were an ac generator. Such induced voltage thus represents the extracted energy. The extracted voltage, in turn, is then used, as needed, to drive the electrical motors that propel the vehicle. Thus, the EMB functions as a motor/generator depending upon whether electrical energy is being applied thereto as an input (motor), or withdrawn therefrom as an output (generator). Unlike a conventional motor/generator, however, the extremely high rotational speeds of the EMB rotor allow great amounts of energy to be stored therein—sufficient energy to provide the motive force for the EV over substantial distances and at conventional speeds.

Hence, without any direct mechanical linkage, the EMB is electrically charged (i.e., its rotor is spun-up to rapid rotational velocities) using electrical current that is inductively coupled to the vehicle through the roadway over which the vehicle travels. Similarly, without any direct mechanical linkage, the EMB is electrically discharged (i.e., energy is withdrawn from the rapidly spinning rotor) by having the rotating magnetic field induce a voltage on the stationary windings, which induced voltage powers the electrical drive system of the vehicle.

Advantageously, an EMB may be manufactured as a standardized EMB module, and several EMB modules may then be connected in parallel, as required, in order to customize the available energy that can be stored for use by the EV to the particular application at hand. For example, a relatively small EV, equivalent in size and weight to a "sub-compact" or "compact" vehicle as is commonly used in the ICE art, may require only two to six EMB modules. A larger or more powerful EV, equivalent in size to a passenger van or high performance vehicle, may utilize 6 to 10 or more EMB modules. A still larger and more powerful EV, equivalent, e.g., to a large bus or truck, may utilize 12–20 or more EMB modules.

Standardizing the EMB module results in significant savings. The cost of manufacturing a standard EMB module, as opposed to many different types of EMB modules, is significantly reduced. Further, maintenance of the EV is greatly simplified, and the cost of replacing an EMB within the EV when such replacement is needed is low.

Additionally, a high operating efficiency is advantageously achieved when an EMB is used as the energy storage element. For example, in an EMB, the entire generator/motor assembly is ironless. Hence, there are low standby losses (no hysteresis effects). In combination with the frictionless magnetic bearings and windless evacuated chamber wherein the rotor spins, this means that the overall efficiency of EMB exceeds 90%, and may be as high as 95% or 96%. Such high efficiencies result in significantly reduced operating costs of the EV.

When inductive coupling is used to transfer power from the embedded roadway coupling elements (coils) to the EV, the preferred coupling frequency of the ac current is in the 1–10 KHz range (typically around 2–3 KHz). The use of such frequency, significantly higher than the conventional 60 Hz or 400 Hz ac signals that are commonly used in the prior art for power coupling purposes, advantageously optimizes the coupling efficiency of the power signal and operation of the EV system. Moreover, by using an ac signal within this frequency range (1–10 Khz), the magnitude or intensity of any stray magnetic fields that might otherwise penetrate into the vehicle or surrounding areas (as electrical power is inductively coupled into the vehicle) is significantly reduced. Having the magnetic fields that penetrate into the vehicle or surrounding areas be of low magnitude is an important safety issue, at least from a public perception point-of-view, as there has been much debate in recent years concerning the possible harmful effects of over-exposure to magnetic field radiation. See, e.g., U.S. Pat. No. 5,068,543.

It is thus a feature of the present invention to provide an efficient, viable, safe, roadway-powered all electric vehicle.

It is an additional feature of the invention to provide such an EV that uses, with only minor modification, the existing network of highways, roadways, and/or garaging/parking facilitates that are already in place to serve ICE vehicles.

It is yet another feature of the invention to provide an EV system wherein the EV's of the system may be recharged while such EV's are in operation within the system. Hence, the EV's need not be taken out of service from the system in order to be recharged, as is common with prior art battery-storage type EV's.

It is an additional feature of the invention to provide an EV, or EV system, wherein the EV uses a high energy, efficient, electromechanical battery (EMB), or a group of EMB's, as an onboard energy storage element. The EMB, due to the use of magnetic bearings and enclosing the rotor in a sealed vacuum chamber, is able to run at extremely high speeds (e.g., exceeding 100K–200K rpm), and thereby provides a large amount of power in a relatively small space.

It is a further feature of the invention to provide an EV system that powers a fleet of electrically-powered buses, or other mass transit electric vehicles, using a demand responsive charging system or scheme. In accordance with such scheme, existing highways and roadways over which the EV's travel are electrified only at select locations, such as: (1) at designated "stops" of the vehicle, e.g., at designated passenger loading/unloading zones, parking garages, or the like; (2) at locations where the vehicle regularly passes, such as roadway intersections; and/or (3) along selected portions of the route, e.g., 50–100 meters of every kilometer over which the vehicle travels.

It is still another feature of the invention to provide an EV system that uses inductive coupling to couple electrical power between embedded coils in the roadway and coils carried onboard the EV. Such coupled electrical power is stored onboard the EV and is thereafter used to provide the motive force of the EV. In accordance with a related feature of the invention, onboard systems and methods are provided that laterally and vertically position the relative spacing and alignment between the onboard coil and the coils selectively embedded in the roadway in order to minimize the air gap between the coils and maximize the alignment between the coils, thereby making the power transfer from the roadway to the vehicle more efficient. Moreover, using such onboard systems and methods, when the EV is stopped, the air gap may advantageously be minimized to zero.

It is an additional feature of the invention to provide an EV that utilizes an on-board control module to perform and coordinate the functions of: (i) receiving the inductive power from the embedded coils in the roadway, (ii) storing the received power as energy in the onboard storage elements, e.g., EMB's, and (iii) selectively extracting the stored energy to power the vehicle.

It is yet a further feature of the invention to provide an EV that includes an onboard power meter that monitors the amount of electrical power that has been received by the EV as it operates on the electrified network of highways and roadways, thereby providing a convenient mechanism for a utility company, that provides the electrical power to the electrified network of highways and roadways to recoup its energy costs.

In addition to the above-identified features of the invention, numerous add-on features may be included as part of the EV system to further enhance its viability. The add-on features may include, for example: (a) establishing a wide bandwidth communication channel with the EV's that permits numerous communication functions (such as telephone, video, and roadway-condition communications) to be carried out via the embedded coils over which the vehicle travels and associated interconnecting power lines or other communication lines; (b) providing fully automated garaging features that permit the onboard EMB's (and/or other storage elements) to be intelligently charged when the vehicle is parked overnight or at other times in a specially-equipped garage; (c) producing electronic coupling between a plurality of roadway-powered vehicles, with one of the vehicles being a "master", and the others being "slaves" that follow the master, to provide, in effect a roadway-powered "train"; (d) using inductive heater coils, powered by the same power source that couples power into the vehicle from the roadway, to melt snow or ice in the vicinity of a loading zone; and (e) ergonomically designing a passenger compartment of the EV to facilitate passenger loading, unloading, seating, and safety.

BRIEF DESCRIPTION OF THE DRAWINGS

The above and other aspects, features and advantages of the present invention will be more apparent from the following more particular description thereof, presented in conjunction with the following drawings wherein:

FIGS. 6C and 6D respectively illustrate electrification of the roadway in clusters, and an enlarged cluster, with clusters being distributed over the length of the roadway;

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Broadly stated, the present invention is directed to a roadway-powered electric vehicle system that includes a network of highways and roadways that have been electrified at select locations, and a fleet of roadway-powered electric vehicles (RPEV's) that traverse the network of highways and roadways and receive their electrical operating power from the electrified highways and roadways. Many of the components that make up the RPEV system of the present invention are components that already exist and have been used for other types of EV systems, or other applications. Such components may be found, for example, and are described in the following documents, all of which are incorporated herein by reference: U.S. Pat. Nos. 4,629,947 (Hammerslag et al.); 4,800,328 (Bolger et al.); 4,836,344 (Bolger); 5,207,304 (Lechner et al.); Ziogas, et al., "Analysis and Design of Forced Commutated Cycloconverter Structures with Improved Transfer Characteristics," *IEEE Trans. Ind. Elec.*, Vol. IE-33, No. 3, p. 271 et seq. (Aug. 1986); Riezenman, *Special Report*, "Electric Vehicles," *IEEE Spectrum* (Nov. 1992, pp. 18–101; Post, et al., "A High-Efficiency Electromechanical Battery", *Proceedings of the IEEE*, vol. 81, No. 3, pp. 462–474 (March 1993).

Figure 1:
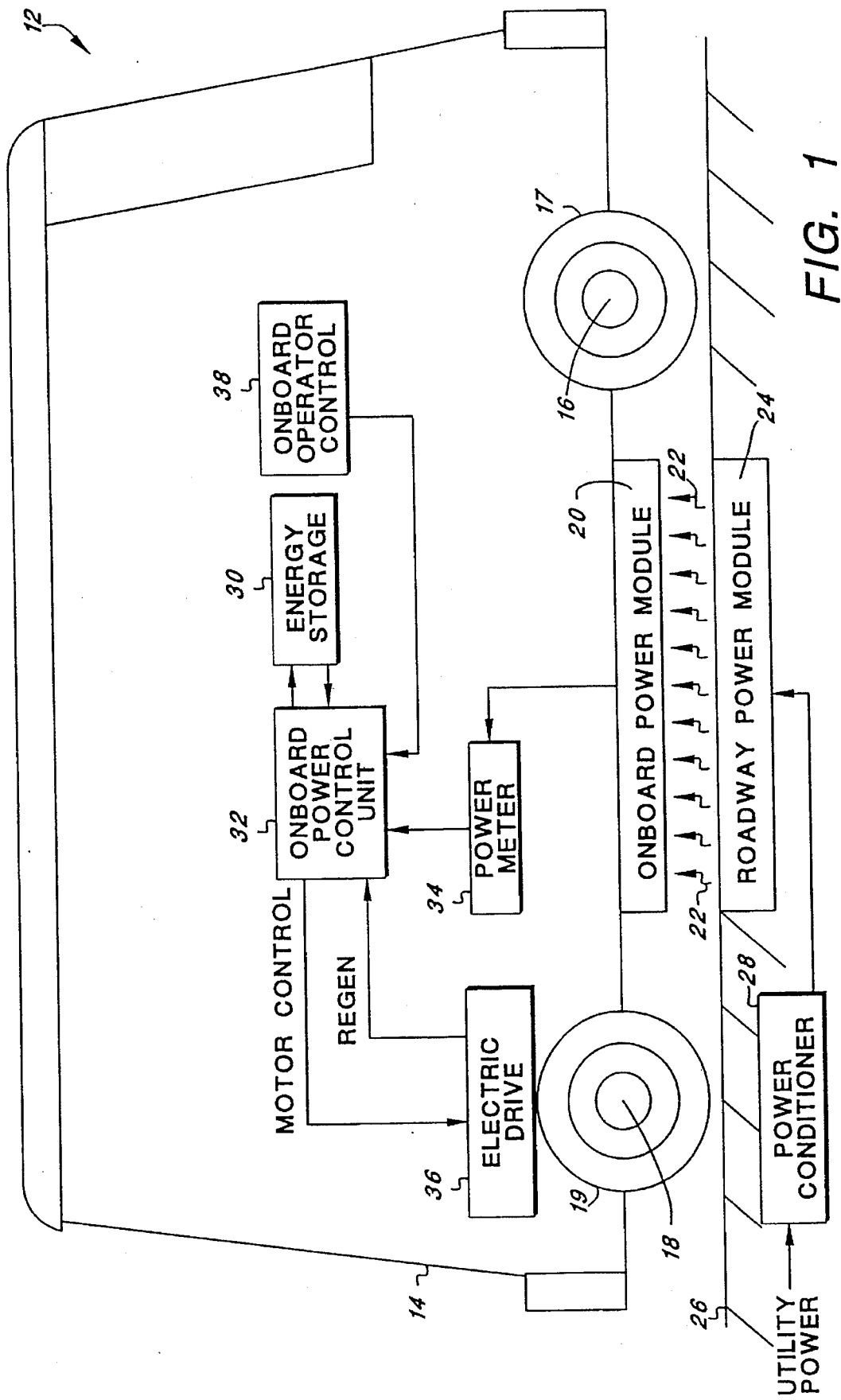
FIG. 1 is a block diagram of a roadway-powered electric vehicle (RPEV) made in accordance with the present invention.

Referring first to FIG. 1, there is shown a block diagram of a roadway-powered electric vehicle (RPEV) 12 made in accordance with the present invention. The RPEV 12 includes a vehicle frame 14 supported by a front suspension system 16, including front wheels 17, and a rear suspension system 18, including rear wheels 19. The frame 14 and suspension systems may be of conventional design. Mounted on the underneath side of the RPEV 14 is an onboard power receiving module 20. The module 20 receives electrical power, symbolically represented by the wavy arrows 22, from a roadway power transmitting module 24 embedded in a roadway 26 over which the RPEV travels. The roadway power transmitting module 24 receives power from a power conditioner circuit 28, which in turn is connected to a utility power distribution system, such as is provided by a public utility company. Typically, the utility company provides electrical power to most customers as 3-phase, 60 Hz power, at 220 vac. Higher voltages may be made available to some customers, as required, such as 480 volts ac (vac). The function of the power converter circuit 28 is to convert the 3-phase, 60 Hz power (at whatever voltage is provided) to an appropriate frequency and voltage for driving the roadway power module 24, as described in more detail below.

Electrical power received from the electrified roadway 26 (the term "electrified" is used herein to described a roadway wherein a roadway power module 24 has been embedded) via the onboard power receiving module 20 is stored in an onboard energy storage system 30. The power is directed to such energy storage system 30 through an onboard power control unit 32. Advantageously, a power meter 34 monitors all electrical power received by the onboard power module 20 so that the utility power company, or other agency, can bill the owner of the RPEV for the cost of such electrical power.

A key feature of the invention is performance achieved from the onboard energy storage system 30, described more fully below. Such storage system exhibits a very high energy storage capacity, on the order of 10–15 Kw-h. Further, such energy storage capacity is provided in a very small volume, e.g., on the order of 0.5–1 $m^3$, at an extremely low weight thereby providing a very attractive energy density, on the order 20–30 kW-h/$m^3$; a high specific energy, on the order of 150 W-h/kg; and a high specific power, on the order of 5–10 kW/kg. (Note that a conventional electrochemical battery, at best, can only provide a specific power of about 0.2–0.4 kW/kg; and an internal combustion engine only provides about 0.6–0.8 kW/kg.)

As described more fully below, the preferred element of the energy storage system 30 is an electromechanical battery (EMB) because it offers a specific power of up to 10 kW/kg, and offers a very high efficiency (power out/power in) on the order of 95% or higher. It is to be understood, however, that the present invention is not limited to the use of an EMB as the energy storage element. Any storage element which offers the specific power, efficiency, specific energy and other criteria set forth herein, may be used with the RPEV system of the present invention. At present, of the available energy storage devices, the EMB appears to best meet the stated criteria, and therefore it is the preferred energy storage element. However, as other alternate energy storage elements are made or developed or otherwise discovered or made available, whether such elements comprise dramatically improved electrochemical batteries, or ultra-capacitors, or other devices, such alternate energy storage elements may be used in lieu of, or in combination with, the EMB's described herein.

The RPEV 12 also includes an electric drive 36 that provides the motive force for propelling the front and/or rear suspension systems. The onboard power control unit 32, which is controlled by onboard operator controls 38 and/or automatic control features programmed into the power control unit 32, selectively directs electrical power from the energy storage system 30 to the electric drive 36. The electric drive 36, and operator controls 38, may incorporate designs and features as are commonly used in existing EV's, e.g., battery-powered EV's, or other EV's, as are known in the art. One such feature common to most EV's, and also applicable to the RPEV of the present invention, is that of regenerative braking. Regenerative breaking takes kinetic energy associated with the motion of the vehicle and redirects it back to the energy storage system 30 rather than having such energy be dissipated as heat, or in some other form, whenever it is necessary to brake the vehicle.

Thus, as seen in FIG. 1, the RPEV receives its operating power through the electrified roadway 26, i.e., through the roadway power module 24; stores such power in a highly efficient energy storage system 30; and then uses such stored energy, as required, to drive the RPEV's electric drive 36. Advantageously, the RPEV 12 is all electric and has zero emissions.

Figure 2:
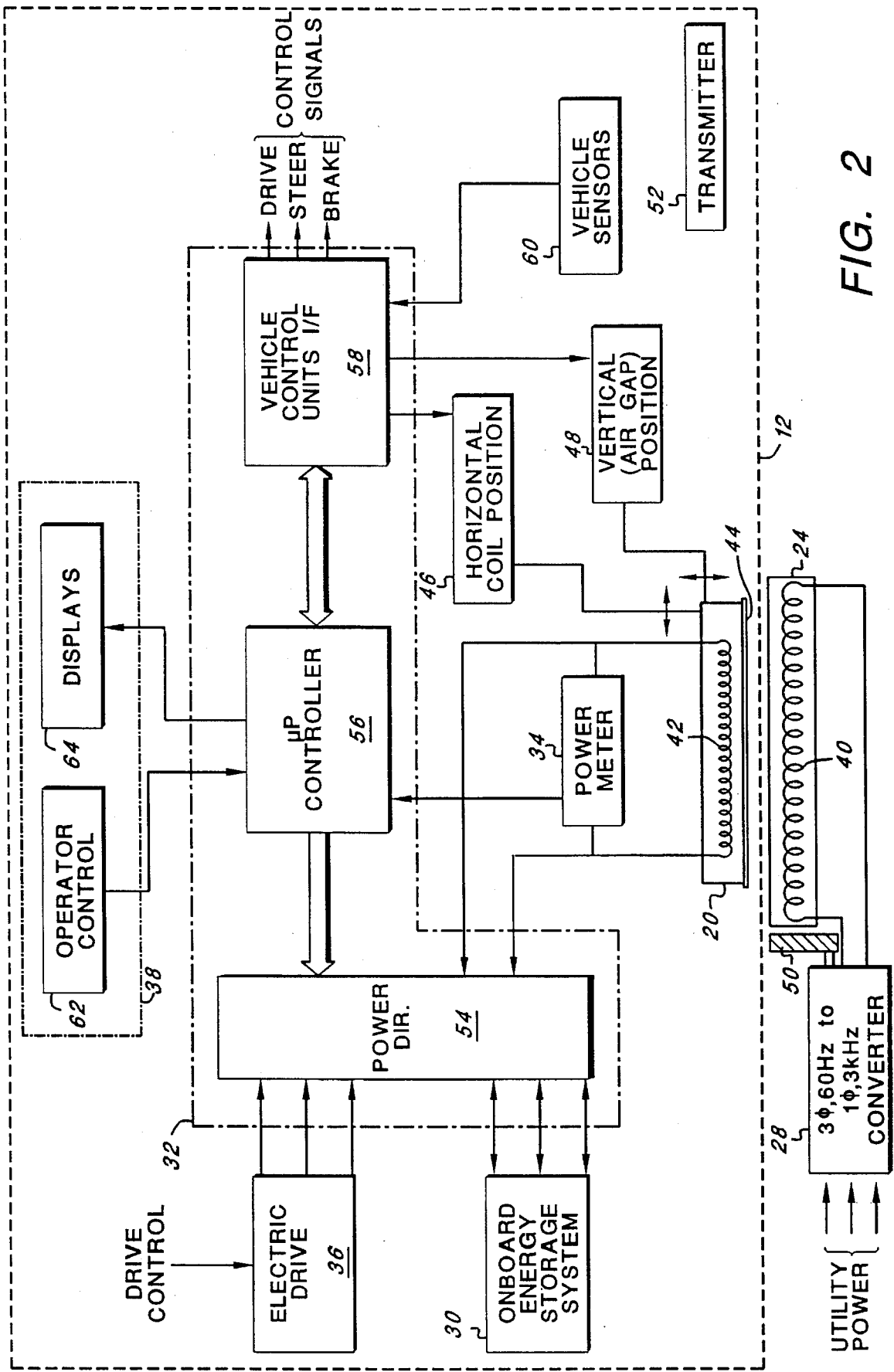
FIG. 2 is a more detailed block diagram of the roadway-powered EV of the present invention.

Referring next to FIG. 2, an electrical block diagram of the RPEV 12 and roadway power module 24 is shown. As seen in FIG. 2, the onboard power control unit 32 of the RPEV includes a power director 54, a microprocessor controller 56 and various vehicle control units 58. As further seen in FIG. 2, the preferred roadway power transmitting module 24 is simply a coil 40. Such coil 40 is connected to the power conditioner 28. The preferred power conditioner 28 is a 3-phase/60 Hz to 1-phase/f1 kHz converter, where f1 is a desired coupling frequency. Similarly, the preferred onboard power receiving module 20 is also a coil 42. When a suitable ac electrical current flows through the coil 40 at frequency f1, such current generates a magnetic field that varies at frequency f1. Such varying magnetic field cuts through the coil 42 and induces a voltage therein according to Faraday's law of induction. When the coil 42 is connected to a suitable load, an ac current is thus established in the coil 42 and power is effectively coupled from the coil 40 to the coil 42.

The coupling between the coils 40 and 42 is referred to as inductive coupling. It is the same type of coupling that occurs in a transformer, except that in a transformer the two coupled coils are closely physically coupled and are usually on the same magnetic core so that the coupling efficiency between the two coils is very high (i.e., all of the magnetic flux generated by the current in one coil cuts through the other coil). Where the coupled coils have an air gap between them, as occurs for this invention (with the coil 40 being embedded in the roadway, and the coil 42 being carried on the underneath side of the RPEV 12), the coupling efficiency is a function of the distance, or air gap, between the two coils 40 and 42, as well as the relative alignment between the coils.

In order to improve the coupling efficiency between the embedded coil 40 and the onboard coil 42, the present invention mounts the coil 42 on a movable assembly 44. The horizontal position of the movable assembly 44 is controlled by a horizontal coil position unit 46. Similarly, the vertical position of the assembly 44 is controlled by a vertical (air gap) coil position unit 48. The positioning units 46 and 48, in combination with the steering of the RPEV 12, thus combine to allow the onboard coil 42 to be optimally aligned with the embedded coil 40 so as to provide the maximum possible coupling efficiency between the two coils. Advantageously, when the RPEV 12 is stopped, for example, e.g., at a passenger loading/unloading zone, or at a signaled intersection, or when parked in a parking zone or garage, the air gap between the onboard coil 42 and the embedded coil 40 may be reduced to zero, or near zero, by lowering the movable assembly 44 until it contacts the surface of the roadway 26 where the roadway power transmitting module 24 is embedded. Such reduction in the air gap, coupled with optimum lateral alignment of the assembly 44 relative to the embedded coil 40, allows a maximum amount of power to be coupled from the embedded coil 40 to the onboard coil 42. Even when the air gap between the two coils is not zero, however, as when the RPEV 12 is simply driving over the electrified roadway, some power is still coupled from the embedded coil 40 to the onboard coil 42. Thus, the RPEV 12 is capable of receiving some power from the electrified roadway 12 simply by having the RPEV 12 drive over or on the electrified roadway.

Two ways of coupling power from the embedded coil 40 to the onboard coil 42 may be used. First, the embedded coil 40 may be continuously energized with an appropriate power signal generated by the power converter 28. Only when the onboard coil 42 comes near the embedded coil 40, however, is significant power transferred through the inductive coupling link. This is because the RPEV 12 represents the electrical load that receives the coupled electrical power. When the load is not present, as when the RPEV is not over the electrified roadway, then there is nowhere for the electrical power to go, and no power transfer (or very little power transfer occurs). This is analogous to having a load, or not having a load, attached to the secondary winding of a transformer. When the load is attached, power is transferred to the load through the transformer. When the load is not attached, no power is transferred to the secondary winding, and no power (other than the power associated with magnetic field losses) is transferred.

A second way of coupling power from the embedded coil 40 to the onboard coil 42 is to incorporate a vehicle sensor 50 into the roadway power module 24. The sensor 50 senses the presence of the RPEV 12, and in response to such sensing, activates the power converter 28 to energize the embedded coil 40. If the RPEV is not sensed, then the power converter 28 is not turned on. Thus, using such sensor 50, only when an RPEV 12 is present on the roadway 26 is the roadway 26 electrified. The sensor 50 may be a conventional vehicle sensor that senses the presence of any vehicle driving on the roadway, e.g., a pressure switch sensitive to weight, an inductive strip or loop, or a magnetic or an optical sensor, as are commonly used in the art to sense vehicles and other large objects. Alternatively, the sensor 50 may be a "smart" sensor that senses only RPEV's and not other types of vehicles. A smart sensor is realized, for example, by incorporating a conventional rf or optical receiver in the sensor 50 that receives a particular type of identifying signal (rf or optical) that is broadcast by a small transmitter 52 carried onboard the RPEV 12, or by employing an optical scanner as part of the roadway sensor 50 that senses or "reads" a bar code placed on an underneath side of the vehicle as the vehicle passes thereover.

Regardless of the manner in which power is inductively coupled to the RPEV 12 through the coils 40 and 42, an important consideration for such inductive power transfer is the frequency (referred to as "f1" above). Such electric power frequency is the dominant system parameter in the RPEV since the alternating current is fundamental to the inductive coupling energy transfer principle, and it affects the size, weight, cost, acoustic noise, flux density and efficiency of the various energy handling systems. Further, the frequency interacts with all of the other system variables in relationships that are generally complex and non-linear. Frequency is thus a basic parameter that appears in the specification for every piece of electrical and electronic apparatus.

The importance of frequency can be further appreciated by recognizing that heretofore only two standard power frequencies have existed for several decades, one at 50/60 Hz, which is the universal industrial and household standard, and the other at 400 Hz, which is an aircraft standard adopted to reduce size and weight. Neither frequency, however, is optimum for the RPEV system of the present invention.

The above "standard" frequencies of 50/60 Hz or 400 Hz, termed for purposes of this application to be relatively "low" frequencies, offer some advantages, particularly in the transmission of power over transmission lines of substantial length. For purposes of the RPEV of the present invention however, it has been determined that a "higher" frequency, in the kHz range, e.g., between 1 and 10 kHz, and preferably between 2 kHz and 3.5 kHz, is the most optimum frequency to use for transferring power through the inductive coupling link and within the RPEV to power the RPEV and to minimize losses. The EMB, for example, while operating at variable frequencies, operates at a nominal frequency of around 3000 Hz. (Note, if the rotor of the EMB is synchronized with a 3000 Hz driving signal, then it is rotating at 180,000 rpm.) Further, on the utility side of the energy transfer, i.e., at the power converter 28, converting the input power from the utility (typically 3-phase, 480 vac, at 60 Hz) to a single phase signal at 3000 Hz can be achieved in a commercially-available power converter.

Another important consideration for using an inductive coupling frequency of around 3000 Hz is the strength or intensity of the stray magnetic fields that might otherwise penetrate into the RPEV as a result of the electromagnetic fields associated with the inductive coupling. As indicated above, there are some safety concerns at present regarding whether exposure to such electromagnetic fields posses a health risk. While there exists no direct evidence confirming such health risk, many who have studied the issue have concluded that the prudent thing to do is to avoid exposure to strong electromagnetic fields. See, e.g., "Electromagnetic Fields", *Consumer Reports*, pp. 354–359 (May 1994). Advantageously, by using a coupling frequency of around 3000 Hz, the strength of the magnetic fields within the RPEV is generally less than 1 mG (milligauss), which is no greater than the background magnetic fields that are present in a typical U.S. home.

Still referring to FIG. 2, it is seen that the power received through the onboard coil 42 is monitored by the power meter 34. The power meter 34 forms an important part of the present invention because it provides a means for a power utility company, or other electrical power provider, to receive payment for the electrical power that it provides to power the RPEV. As such, the power meter 34 is preferably mounted in such a way so that it is tamper proof and so that it cannot be bypassed, similar to the power meters that are installed in most commercial and residential facilities. Similarly, although not mandatory, it is preferred that the power meter 34 include means for downloading the power measurements ("power data") that have been made. As described more fully below, included on the RPEV is a communication channel that permits information to be sent to and from the RPEV from a location remote from the RPEV, e.g., via the power transmitting module 24 and other sensors/transducers associated therewith. When such communication channel is used, the power data from the power meter 34 may be included with the information transmitted from the RPEV. Once downloaded, such power data is preferably directed to the power utility company. The power utility company is then able to bill the appropriate owner of the RPEV for the electrical power that has been used.

In some configurations, the RPEV 12 includes an identification data signal that is transmitted from the vehicle each time that electrical power is coupled thereto when the RPEV is stopped, and therefore when the assembly 44 has been lowered to reduce the air gap to near zero. Before electrical power is transferred, the RPEV identification data signal is verified, and power data is read from the power meter.

Power received through the onboard coil 42 is coupled through a power director 54 to the onboard energy storage system 30. Also coupled to the power director 54 is the electric drive 36. It is the function of the power director 54, as its name implies, to direct power to and from the onboard energy storage system 30 and the electric drive train 36. Power is initially directed, for example, from the onboard coil 42 to the energy storage system 30. Power is also directed, as required, from the energy storage system 30 to the electric drive train 36. Regenerative power may also be directed, when available, from the electric drive train 36 back to the onboard energy storage system 30.

The power director 54 is controlled by the microprocessor controller 56. The microprocessor controller 56, which is realized using a conventional processor-based system, such as the Motorola 68000 series, or the Intel 386/486 series of processors, both of which are well documented in the art, has appropriate RAM/ROM memory associated therewith wherein there are stored numerous operating routines, or programs, that define various tasks carried out by the controller 56. Many such tasks are the same as are carried out with the operation of any EV. For purposes of the present invention, the most significant tasks carried out under control of the controller 56 relate to directing the power to and from the energy storage system (explained below in conjunction with FIG. 3), controlling the lateral and vertical position of the assembly 44 on which the onboard coil 42 is mounted, receiving appropriate commands from the operator control devices 38, and monitoring onboard vehicle sensors 60.

The operator control devices 38 include both operator control input devices 62 and vehicle displays 64. The input control devices include, e.g., manual switches or controls that determine speed, direction, braking, and other controls, associated with the manual operation or driving of the RPEV. Such devices are of conventional design and operation. The displays 64 are also of conventional function and design, indicating to the operator such parameters as vehicle speed and the status of the energy storage system 30.

The operator input control devices 62 generate input signals to the microprocessor controller 56. The microprocessor controller 56, in turn, responds to such input signals by generating appropriate output signals that are directed to a set of vehicle control units 58. The vehicle control units 58 perform the function of interface (I/F) units that convert the signals output from the controller 56, which are digital signals, to the requisite signals for actually effectuating the desired control. Thus, for example, a braking signal may be sent from the operator control 62 to the processor controller 56. The processor controller 56 would process the braking control signal in an appropriate manner relative to the current status of the RPEV, e.g., speed, direction, etc., as determined by the vehicle sensors 60, and would determine the appropriate amount of braking needed. It would then send its output signal to a braking control unit (one of the control units 58), which would convert it to an appropriate analog signal. The analog braking signal is then directed to a conventional braking mechanism, i.e., a hydraulic control pump, that would apply the appropriate hydraulic pressure to the vehicle's braking system. Similar processes are carried out for driving the vehicle at a desired speed, steering the vehicle, and the like.

Some of the RPEV "driving" functions of the RPEV, although normally under manual control of the operator through the operator control devices 38, may also be automated, or controlled by the controller 56 in accordance with a prescribed or preprogrammed regime. For example, a key feature of the RPEV of the present invention is to incorporate lateral, as well as vertical (air gap) positioning of the assembly 44 on which the coil 42 is mounted. Thus, as the operator of the RPEV approaches, e.g., a passenger loading/unloading zone, he or she activates an auto-positioning control that effectively "takes over" the driving of the vehicle for the final 10–15 feet. Once the auto-positioning function is activated, the vehicle sensors 60 sense the position of the RPEV 12 relative to the roadway power transmitting module 24 embedded in the roadway. The steering of the vehicle is then controlled by the microprocessor controller 56 so that the vehicle is laterally positioned, to within a rough tolerance, e.g., ±5–10 cm, of the optimum lateral position when the vehicle comes to its designed stopped location. Once stopped, the horizontal coil positioning unit 46, typically realized, e.g., using conventional hydraulic and/or electronic positioning devices, further controls the lateral position of the coil 42 so that it is more closely aligned, e.g., to within ±1–2 cm, of the optimum lateral position. Once the assembly 44 has been aligned laterally, or concurrent with the lateral alignment of the assembly 44, the vertical (air gap) positioning unit 48, also typically realized, e.g., using conventional hydraulic and/or electronic positioning devices, lowers the assembly 44 so as to reduce the air gap to near zero.

With the air gap near zero, the onboard energy storage system 30 is charged with additional power obtained from the power converter 28 through the inductive coupling link (which operates at maximum efficiency with a near zero air gap). Before the RPEV is allowed to move, i.e., before the RPEV can be driven away from the passenger loading/unloading zone, the vertical positioning unit 48 raises the assembly 44 back to its normal position on the underneath side of the RPEV frame.

The vehicle sensors 60 comprise a variety of different types of sensors that sense all of the parameters needed for proper operation of the RPEV. Such sensors sense, e.g., temperature, lane position, distance from nearest vehicle or object, and the like. For purposes of laterally positioning the assembly 44, such sensors are typically optical sensors that look for markers placed on the roadway power transmitting module 24 embedded in the roadway. Other types of sensors may also be used for this purpose, including acoustic, mechanical, and electromagnetic sensors.

When the RPEV is traveling (being driven) on an electrified portion of a highway or roadway, the lateral (horizontal) positioning device 46 is also activated so that the coil 42 can maintain, to within a rough tolerance, an optimum lateral position relative to the coil 40 that is embedded in the roadway. In such instances, and even when the vehicle is stopped, instead of using the sensors 60, or in combination with using the sensors 60, to sense the relative lateral location of the coil 42 to the coil 40, the approximate lateral position may be determined by monitoring the change in the amplitude of the inductively received power signal as the coil 42 is laterally moved in one direction or the other. The processor controller 56 then laterally positions the coil 42, using the horizontal coil positioning unit 46 and/or the steering of the RPEV, to maintain the coil 42 at a lateral position that keeps the induced power signal at a peak or maximum level.

Figure 3:
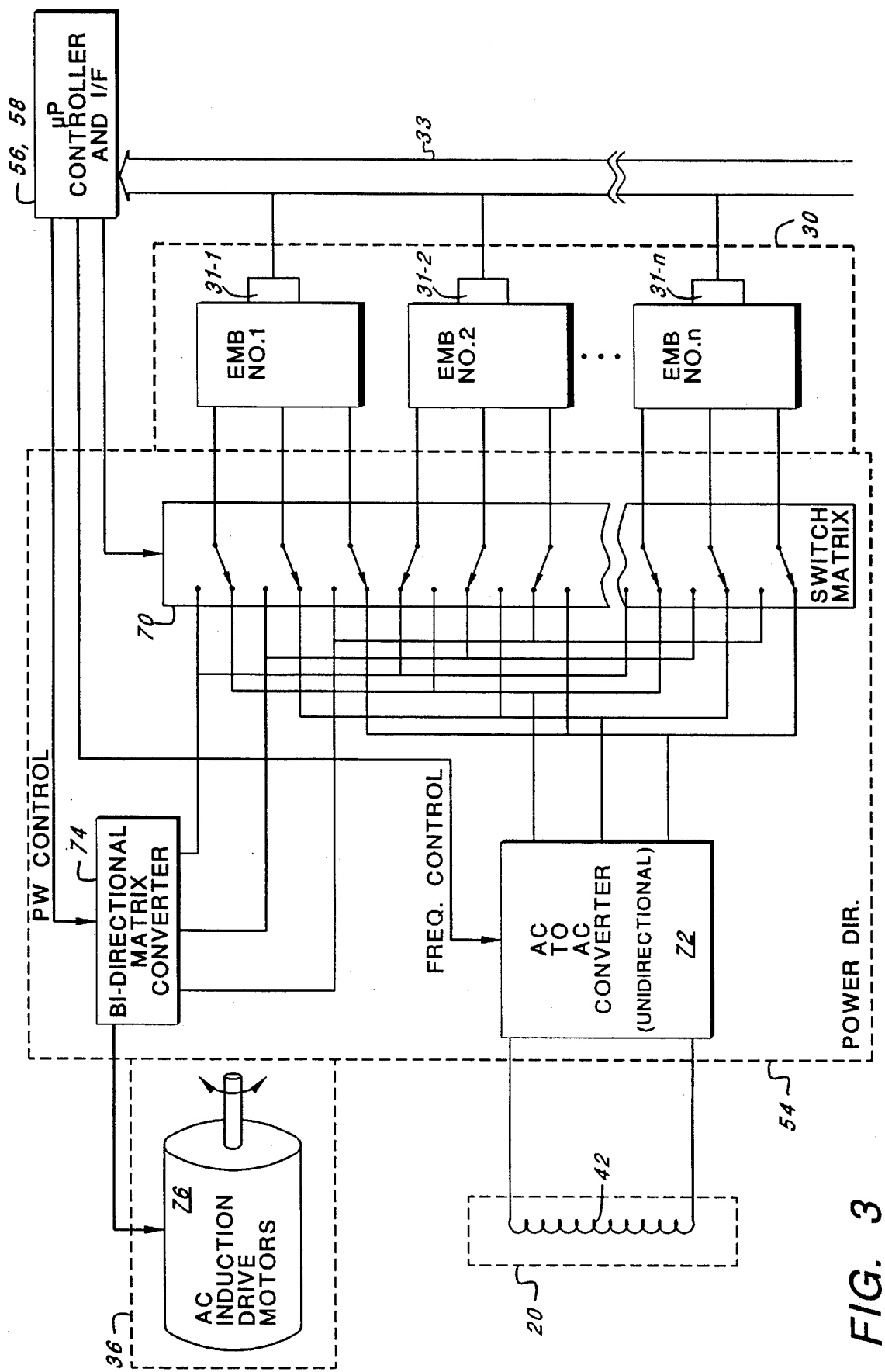
FIG. 3 is a block diagram of the on-board power director of FIG. 2, and illustrates how the on-board energy storage system of FIG. 2 is preferably realized using a plurality of electromechanical battery (EMB) modules.

Turning next to FIG. 3, a block diagram of the onboard power director 54 and the onboard energy storage system 30 is shown. As seen in FIG. 3, the preferred onboard energy storage system 30 comprises a plurality of electromechanical battery (EMB) modules, labeled EMB-1, EMB-2, ... EMB-n. Each EMB module is constructed as described below in conjunction with FIGS. 8 and 9A and 9B. The power director includes a switch matrix 70, a unidirectional ac-to-ac converter 72, and a bidirectional matrix converter 74. The bidirectional matrix converter 74 is connected to the electric drive train 36, which includes one or more ac induction drive motors 76. The ac-to-ac converter 72 is connected to the onboard receiving coil 42 through which inductively coupled electrical power is received.

Each EMB includes three power terminals, representing the 3-phase signals that are applied thereto (when the EMB is being charged), or extracted therefrom (when the EMB is acting as an ac generator). A set of switches, one set for each EMB, connects each power terminal of each EMB to either the ac-to-ac converter 72 (when electrical power is being applied to the EMB to charge it) or the matrix converter 74 (when electrical power is being extracted from the EMB and applied to the induction drive motors 76 that form part of the electric drive train 36; or when regenerative electrical power is being applied back to the EMB from the motors 76).

The unidirectional ac-to-ac converter 72 is of conventional design. The power signal received through the coil 42 comprises a single phase, e.g., 3000 Hz signal. This signal is rectified, and then chopped with an appropriate frequency control signal(s), provided by the microprocessor controller 58, to create a 3-phase signal of varying frequency. Each phase of the 3-phase signal thus generated is applied to the switch matrix 70 so that each phase may, in turn, be selectively applied to the respective input terminal of each EMB of the energy storage system. Each EMB is charged (energy is stored therein) by applying a 3-phase signal thereto that causes the rotor of the EMB to spin at the frequency of the applied signal. By applying a 3000 Hz, 3-phase signal, for example, to the terminals of the EMB, a rotating magnetic field is established within the EMB that rotates at a rate of 3000 revolutions per second, or 180,000 revolutions per minute (rpm). If the rotor is stopped when such a signal is applied, then it spools up to the speed corresponding to the applied frequency, representing the storage of energy. If the rotor is rotating at a speed less than the speed corresponding to the applied frequency, then the rotor speed increases to match the speed dictated by the applied frequency, representing the storage of additional energy. If the rotor is rotating at a speed greater than the speed corresponding to the applied frequency, then the rotor speed decreases to match the speed dictated by the applied frequency, representing a decrease in the energy stored in the EMB. Thus, the key to spooling up, or charging, a given EMB to increase the energy stored therein is to apply a signal thereto having a frequency corresponding to a rotor speed that is greater than the present rotor speed.

In view of the above, one of the main functions of the microprocessor controller 56 is to monitor the rotor speeds of each EMB within the energy storage system 30 so that when an input signal is received through the onboard coil 42, it can be converted to a 3-phase signal having an appropriate frequency sufficiently high so that it will increase the present EMB rotor speed, thereby storing additional energy in the EMB. To this end, each EMB includes a means 31 for determining its rotor speed, shown functionally in FIG. 3 as the speed sensors 31-1, 31-2, ... 31-n. Each of the speed sensors 31-1, 31-2, 31-n is coupled to the controller 56 through a suitable bus 33. In practice, a separate rotor speed sensor is not needed, as the rotor speed of each EMB may be determined by simply sampling the ac signal generated by the EMB when operating in a generator mode. However, in order to emphasize the importance of sensing the EMB rotor speed (which provides a measure of the energy stored therein), separate functional speed sensors are shown in FIG. 3.

The bidirectional matrix converter 74 performs the function of taking the 3-phase signals generated by each EMB (when functioning as an energy source, or generator) and converts such signals as required in order to drive the ac induction motors 76 included in the electric drive train 36. When the RPEV is braking, or coasting (e.g., going down hill), the matrix converter 74 also performs the function of taking any energy generated by the motors (which, when the RPEV is braking or coasting, are really functioning as generators) and reapplying such energy to the EMB's of the energy storage system 30. The matrix converter 74 may be as described, e.g., in Ziogas, et al., "Analysis and Design of Forced Commutated Cycloconverter Structures with Improved Transfer Characteristics", *IEEE Trans. Ind. Elec.* Vol. IE-33, No. 3, 271 (Aug. 1986).

The switch matrix 70 performs the function of a plurality of switches that connect the set of power terminals of each EMB to either the matrix converter 74 or the ac-to-ac converter 72. Such switch matrix may take various forms, including electrical relays, solid state switches, SCR's, diodes, and the like.

One of the advantages of using the EMB as the basic building block of the energy storage system 30 is that each individual EMB may be of a standard size and design. A conventional EMB, for example, is designed to provide an energy capacity of 1 kW-h. By using fifteen such EMB modules in parallel, as shown in FIG. 3, the overall energy capacity thus increases to 15 kW-h. For smaller, lighter, RPEV's, only a few EMB's are needed to power the vehicle, e.g., 2–6. For larger, heavier RPEV's, such as trucks and vans, more EMB's are needed, e.g., 6–10, or more. For even larger RPEV's, such as buses, further EMB's are added as required, e.g., 12–20, or more.

The specifications of a typical RPEV made in accordance with the present invention are as shown in Table 1.

TABLE 1

| Specifications of Typical Roadway-Powered Multiple Occupancy All Electric Vehicle | |
|---|---|
| Item | Description |
| UTILITY POWER | 480 vac, 60 Hz, 3-phase |
| POWER CONDITIONER | Input: 480 vac, 60 Hz, 3-phase Output: 225 kW, 3 kHz, 1-phase |
| ROADWAY POWER TRANSMITTER MODULE | 3 kHz, 300 amps, 200 kW. Module Length: 3 meters |
| ONBOARD POWER RECEIVING MODULE | 3 kHz, 200 kW; Mounted on movable assembly to provide multiple pickup positions |
| ONBOARD POWER CONTROLLER | Functions: Motor Controller; Regeneration Management; Pick-up Power Control; Onboard Energy Storage Control; Monitoring State of Change; Metering Energy Consumption |
| ONBOARD ENERGY STORAGE | 15 kW-h (15 1 kW-h modules @ 10 kW each, 3 kHz (nominal) |
| ELECTRIC DRIVE TRAIN | Two 35 kW AC Motors |
| MULTIPLE OCCUPANCY VEHICLE (MOV) DESIGN FEATURES | 10–15 seated passengers; 110 km/h max speed; low floor; platform loading; electric propulsion; electronic guidance; electronic coupling. |

TABLE 1-continued

Specifications of Typical Roadway-Powered Multiple Occupancy All Electric Vehicle

| Item | Description |
| --- | --- |
| ONBOARD CONTROL SYSTEM | Functions: electronic steering; lateral guidance control; electronic coupling and platform control; vehicle diagnostics; vehicle ID; "throttle" control; brake control; speed profile control; route control; vehicle "flight recorder". |
| ROADWAY CONTROL ELEMENTS | Functions: roadway-vehicle communication; lateral guidance signal; speed markers; vehicle ID interrogation; roadway surface condition sensors. |

Figure 4:
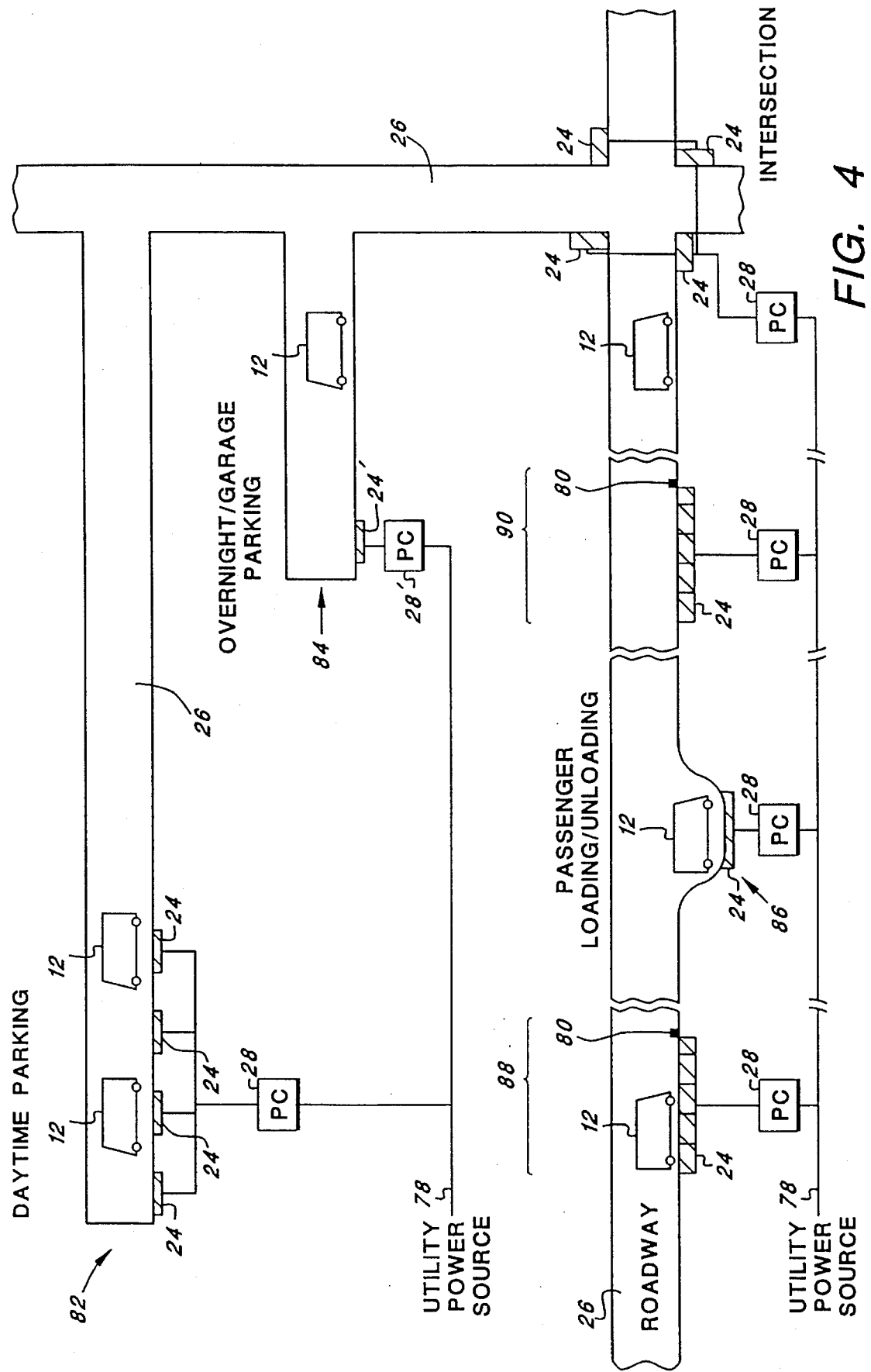
FIG. 4 schematically illustrates a roadway-powered EV system made in accordance with the present invention.

Turning next to FIG. 4, there is shown a schematic illustration of a roadway-powered electric vehicle (RPEV) system made in accordance with the present invention. The RPEV system includes a network of roadways and highways 26, selected portions of which have been electrified with a roadway power transmitting module 24, over which a fleet of RPEV's 12 may travel. Each power transmitting module 24 is connected to a utility power source over suitable power lines 78, as previously described.

As indicated above in Table 1, the roadway power transmitting modules 24 are typically about 3 meters in length. For many locations of the roadway/highway network, a single module 24 is all that is required in order to efficiently couple to an RPEV that is above it. At other locations, e.g., along a section where there is no planned stopping of the RPEV's, such as areas 88 and 90, several modules 24, laid end-to-end, will be needed. Thus, at parking locations 82, or in an overnight parking garage area 84, or even at a passenger loading/unloading zone 86, and other locations where it is anticipated that the RPEV will be stopped for a sufficient charging time, a single power transmitting module of 3 meter length is all that should be needed. In fact, for a garage/parking situation, a shortened (e.g., 1–2 meters) power transmitting module 24' can normally be employed and still provide adequate coupling with the parked RPEV. Further, at strategic locations throughout the network of roadways/highways 26, various sensors 80 may be positioned to provide an indication of roadway surface conditions. Such information may be transmitted to the RPEV's 12 through conventional means, e.g., rf transmission; or through modulation of the power signal transmitted over the primary power line 78 and inductive coupling link with each vehicle.

Figure 5A:
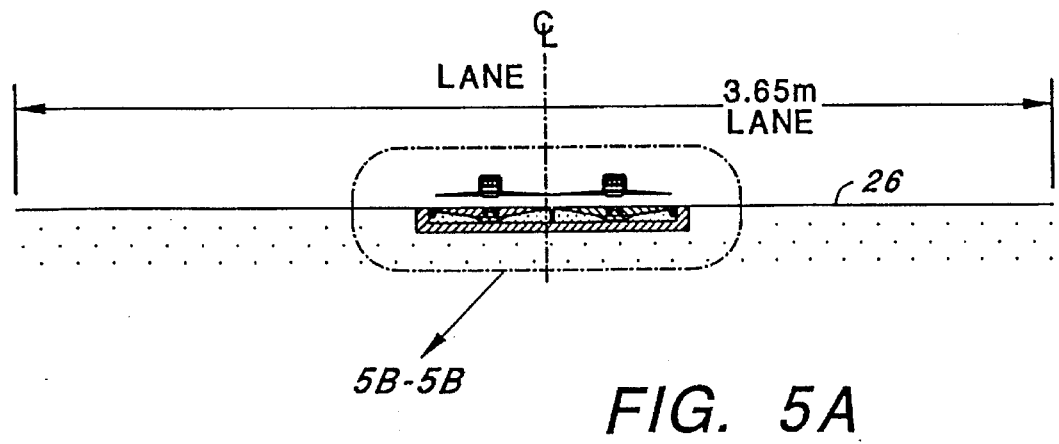
FIGS. 5A and 5B respectively show a cross section, and an enlarged cross section, of a roadway having a coil embedded therein that serves as the roadway power module of the roadway-powered EV system.
Figure 5B:
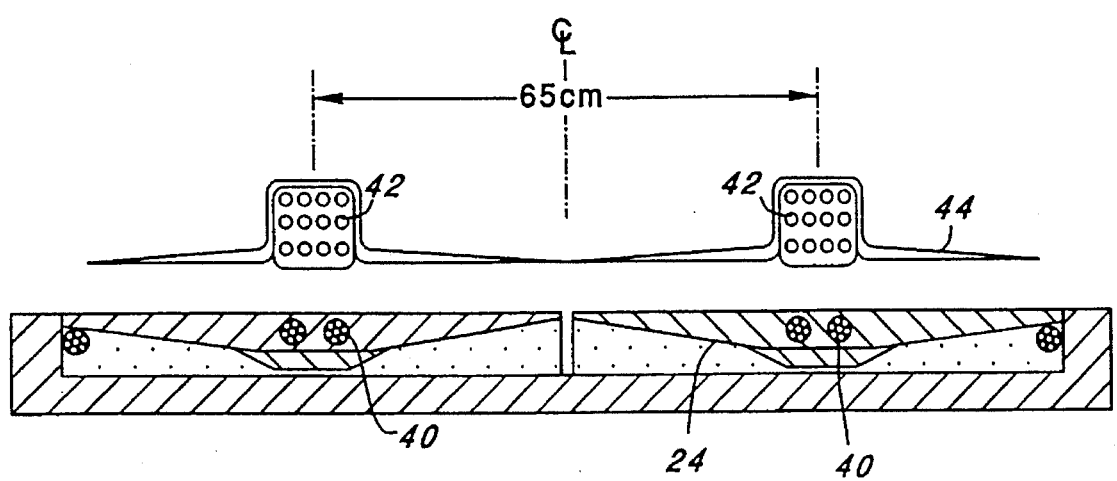

A cross-sectional view of the roadway power transmitting module 24 is illustrated in FIGS. 5A and 5B, with FIG. 5B showing an enlarged view of the section of the roadway that is circled in FIG. 5A. The preferred width of the coils 40 and 42 is about 65 cm, as seen in FIG. 5B, with the coil being centered in a typical lane of about 3.65 meters in width, as seen in FIG. 5A. Both the embedded coil 40 and the onboard coil 42 may be characterized as "flat" or "pancake" coils that lie in respective planes that are parallel to the surface of the road 26.

With reference to the RPEV system of the present invention, it is noted that a conventional battery-driven electric vehicle is normally charged overnight for several hours in one's garage, and then the vehicle starts off the day with a full charge on the batteries. The rate of charge is inherently constrained by limitations of power available in the typical household, since 200 KW, if installed, would be prohibitively expensive. The rate of charge in the home is thus limited to 6 KW to 10 KW, which means that a typical recharge takes several hours.

The term "opportunity charging" has been used in the prior art to signify other times when a stopped vehicle can receive a charge, for example at curbside or in a parking garage, where it is stationary and can be plugged in.

Advantageously, with the RPEV system of the present invention, the idea of opportunity charging takes on a whole new meaning. In fact, since opportunity charging is so different for the RPEV system, a new term has been coined, "demand charging" or "demand responsive charging," to signify the difference. Demand responsive charging is, as previously explained, made possible by two technologies: (1) the non-contacting inductive coupling energy transfer system, and (2) an energy storage system that allows a very high rate of charge to take place. The combination of these two technologies and the associated onboard power control unit 32 make it possible to replenish the stored energy of an RPEV in minutes, not hours.

At least four types of demand responsive charging are possible with the RPEV system, described below.

A first type of demand responsive charging is charging of electric buses, using inductive coupling pads, at about 25 percent of its stops. Such charging transfers enough energy for the bus to run continuously for 24 hours a day, if necessary, since the energy storage system is being constantly replenished. This means that for a bus system less than 1 percent of the route would need to be electrified, contrasted with the trolley bus, which has 100 percent electrified. From a cost standpoint, this means that a bus line can be electrified for less than 4 percent of the cost of overhead wires. It makes a practical electric bus possible for the first time.

For the bus, the energy transfer takes place for a 20 second to 30 second period when the vehicle is fully stopped, thus the air gap can be zero, or nearly zero, thereby greatly improving the efficiency as well as the rate of power collection. A representative electrification of a bus stop along a highway route is shown at area 86 in FIG. 4. Advantageously, using such demand responsive charging system for a bus line as described above makes possible an all-electric bus system that is competitive with a diesel bus in life cycle costs.

It should also be noted that in many cases, a bus has assigned layover points where it must wait for a few minutes in order to synchronize its route with an advertised schedule. In such instances, a charging pad 24 may be installed at the layover point, and the RPEV bus could get enough energy replenishment in 3 to 5 minutes to run much of its assigned loop or route without the need for further energy transfer.

Figure 6A:
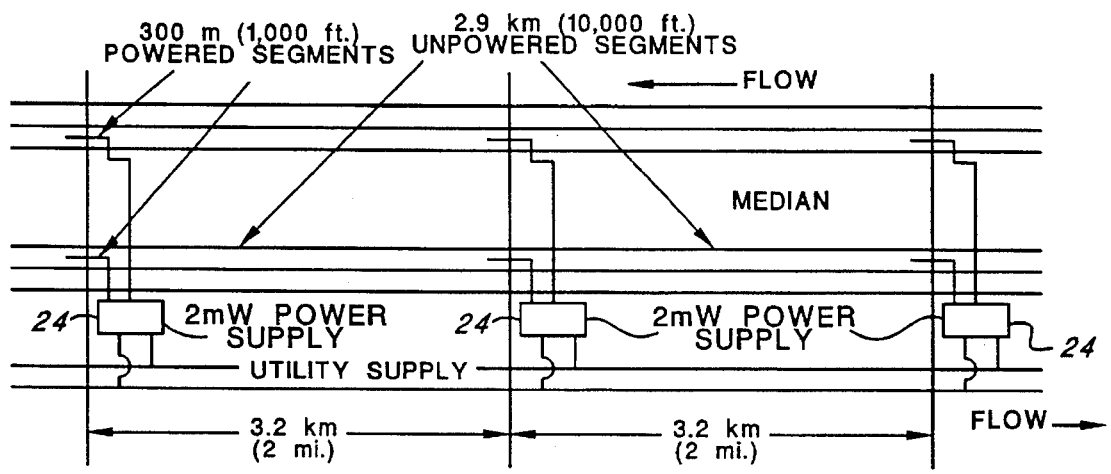
FIG. 6A depicts one manner in which only a portion of the roadways over which the roadway-powered EV travels need be energized with roadway power modules.

A second type of demand responsive charging for use with the RPEV system of the present invention is that of automobile and highway, and depicted in FIG. 6A. Heretofore, it has been assumed that an effective electrification system would require the heavily traveled freeway lanes to be fully electrified, i.e., at least one lane in each direction for even a thin network in a region. In the San Diego region, for example, this would mean about 500 lane-kilometers (312 lane miles) would need to be electrified if one established an electrification network on the freeways. However, with the RPEV system of the present invention, only about 10 percent of the powered lane actually needs power, with the remaining 90 percent being unpowered, as shown schematically in FIG. 6A. Hence, when the RPEV travels over the 10% of the lane that is electrified, it is charged, which charge provides sufficient energy for it to travel the remaining 90% to the next electrified location. In practice, of course, a large safety factor is designed into the RPEV so that it has the capacity, when fully charged, to travel much further than the 90% distance to the next charging location. However, the point is that the RPEV receives a charge as it is traveling over electrified portions of the roadway. From a system specification standpoint, minimum power transfer rates of 100 to 140 kW in motion, or roughly 30 to 50 KW/m, are desirable. The onboard energy storage system 30, when realized using a network of EMB's, advantageously permits this rate of power collection to take place.

A variation of the demand responsive charging system shown in FIG. 6A is depicted in FIGS. 6C and 6D. In FIGS. 6C and 6D, the roadway power transmitting modules 24 (charging pads) are spaced about every 300 m over a distance of, e.g., 1.2 km, and are thus grouped in clusters 25 of five modules 24 each, with each cluster 25 being powered from the same power conditioner 28. The clusters 25 are then selectively spaced along the length of the roadway, e.g., with a non-electrified section of roadway of about 3.6 km separating the clustered sections. Thus, for the cluster configuration shown in FIG. 6C, a new cluster of power transmitting modules 24 is found about every 4.8 km of the roadway.

Figure 6B:
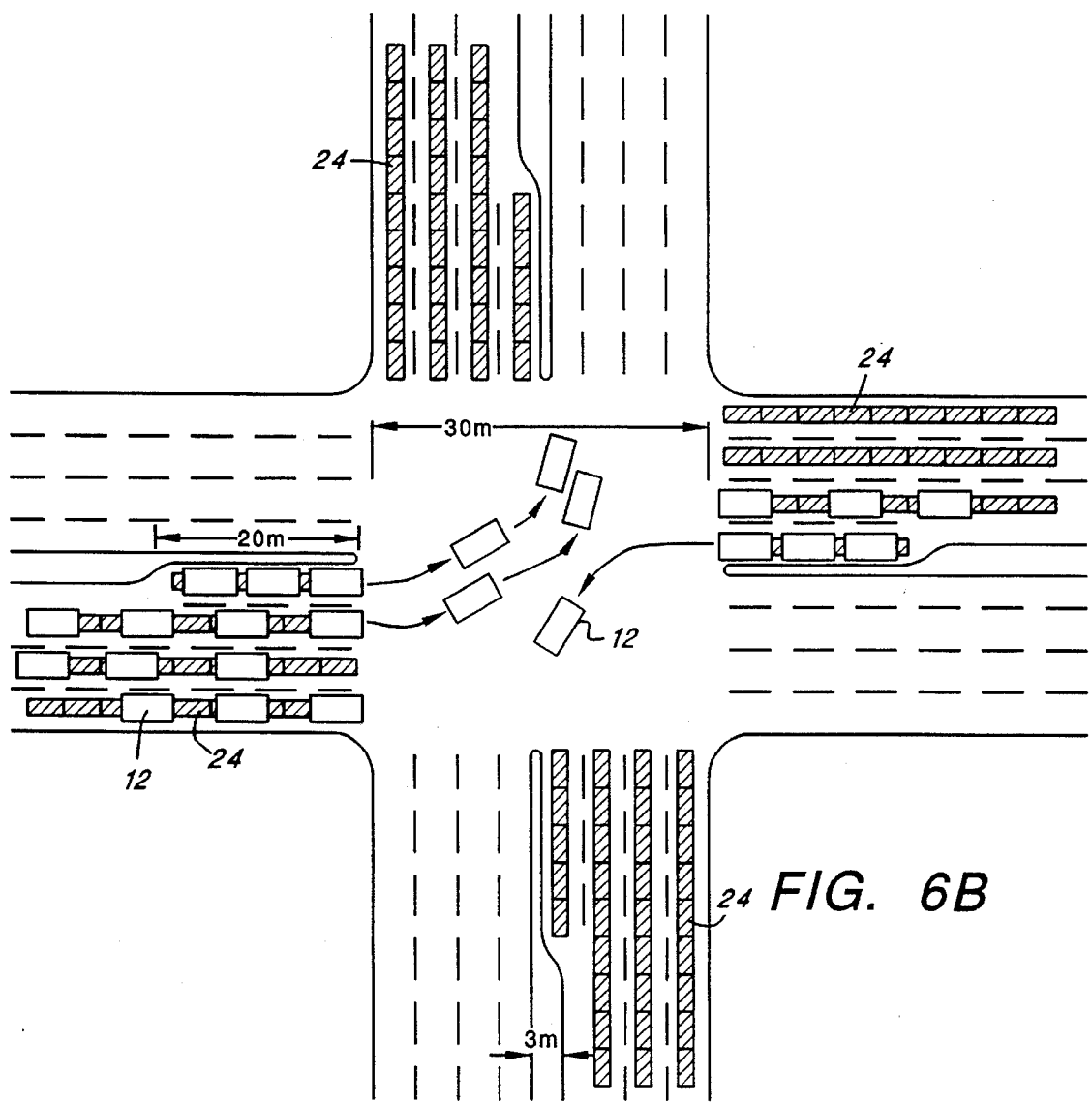
FIG. 6B depicts the electrification of the roadway at a multi-lane, signalled intersection, where vehicles must often come to a complete stop as they wait their turn to go through the intersection.

A third type of demand responsive charging for use with the RPEV system is that of selective electrification of a signalized arterial intersection, as shown in FIG. 6B. In FIG. 6B, which shows an aerial view of a typical intersection, the electrified portions of the intersections, i.e., those that have the roadway power transmitting modules 24 embedded therein, are shaded. All RPEV's 12 passing through the signalized arterial intersection are able to take advantage of demand responsive charging. The typical transit time through the intersection is about 45 seconds to 60 seconds. During this time, the RPEV receives as much energy from the roadway module 24 as it could in a mile of a powered lane on the highway. Thus by electrifying the last 30 meters of a signalized intersection lane, or lanes, 2% of the arterial lane being electrified has the same effect as fully electrifying the lane.

Figure 7A:
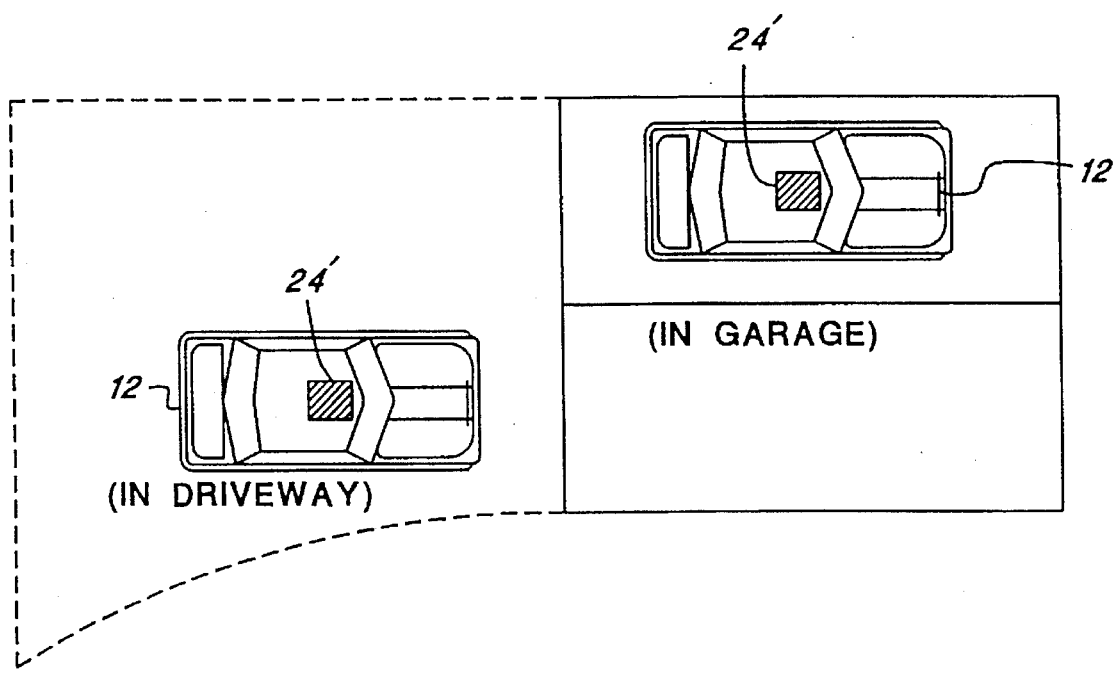
FIGS. 7A and 7B respectively show an overhead, and enlarged cross section, of one manner in which electronic garaging or overnight charging may be realized within a roadway-powered EV system made in accordance with the invention.
Figure 7B:
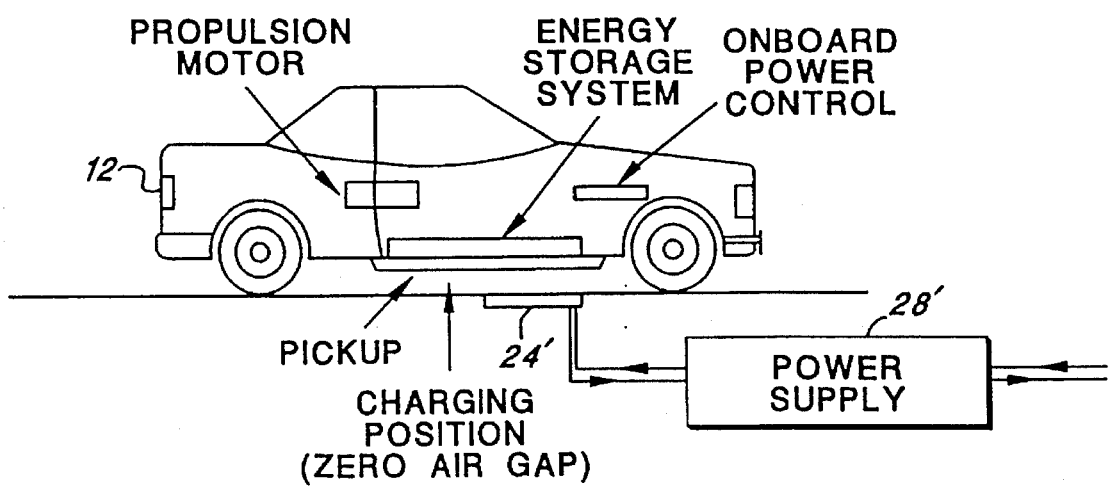

A fourth type of demand responsive charging that may be used with the RPEV system is that of electric garaging. In electric garaging, a charging pad 24' approximately 1 meter square and 3 cm thick, is installed on the surface of a driveway or garage floor, as shown in FIGS. 7A and 7B. The pad 24', and associated power conditioner (power supply) 28', are capable of operating in two modes. In a first electric garaging mode, low levels of continuous energy flow, e.g., 200 watts to 500 watts, are provided. Such energy flow is used to provide a stable interior temperature in the RPEV 12 from about 50° F. to 70° F. corresponding to cold or hot climates. The RPEV commands the rate of energy flow according to its need to regulate interior temperatures, and is thermostatically controlled.

The energy transfer system for the electronic garaging first mode is preferably actuated remotely a few minutes in advance of use to bring interior temperatures to a comfortable level, and a data link between the roadway and vehicle will provide security against tampering or theft. The mechanical gap between the vehicle pickup coil 42 and the roadway element 24' is adjusted to essentially zero in this mode of operation, as well as in the static charging mode described next.

In a second electronic garaging mode, the pad 24' is used for an overnight recharging of the energy storage system 30 of the RPEV 12. In this case the power flow levels are between 6 KW and 10 KW (comparable to an electric clothes dryer in a residence), and the time for recharge ranges from 1 hour to 2 hours.

Preferably, the electronic garaging operates in a demand responsive mode, and is fully automated and hands-off for the driver. The RPEV generates an enabling signal to carry out the charging at times of day when utility rates are lowest, e.g., at 2:00 a.m., turning it off when the energy storage is replenished.

Figure 13:
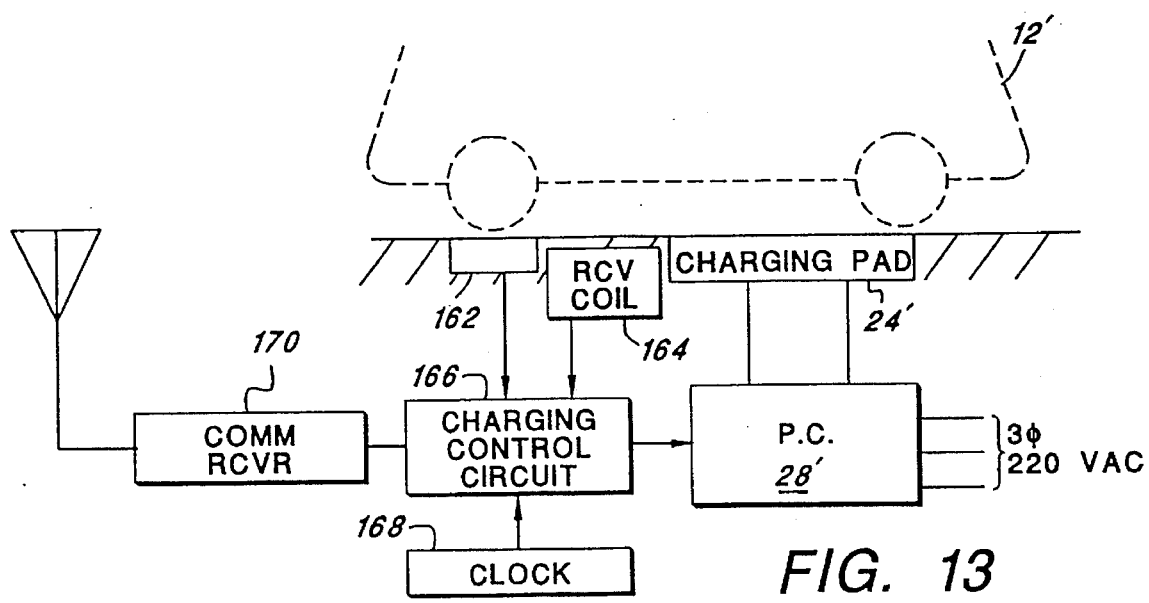
FIG. 13 is a block diagram that functionally depicts the automatic garaging features of the invention.

The circuitry needed to accomplish the two modes of automatic garaging described above is further depicted in FIG. 13. A pressure sensor 162 senses the presence of a vehicle 12' parked above the charging pad 24'. A receive coil 164 (which may function as the sensor 50 (FIG. 2) may further be used to verify the identity of the vehicle 12'. A charging control circuit 166 controls when the power conditioner 28' is allowed to charge the charging pad 24' and at what charging level. To this end, a clock circuit 168 provides an indication to the control circuit 166 of the time of day so that the high level charging mode can occur when the electric rates are the lowest. In like manner, a communication receiver 170 is attached to the control circuit 166 so that the low level charging mode (used, e.g., to bring the interior of the vehicle 12' to a comfortable temperature) may be invoked on command. The owner of the garaged vehicle, for example, may invoke the low level charging mode using a remote transmitter, similar to a garage door opener transmitter; or by throwing a remote switch that is electrically coupled to the receiver 170.

The RPEV, as previously described, may issue an enabling signal to command the energy transfer to take place, depending on the energy storage requirements at that moment. A high rate of energy transfer for a short period is preferred, if possible. But regardless of whether the transfer is for a short period of time, as at an intersection or bus stop, or for a longer period of time, as at a parking stall or garage, the system is charged only as needed and as requested or demanded, hence the term "demand responsive charging" properly describes the charging action that takes place.

Figure 8:
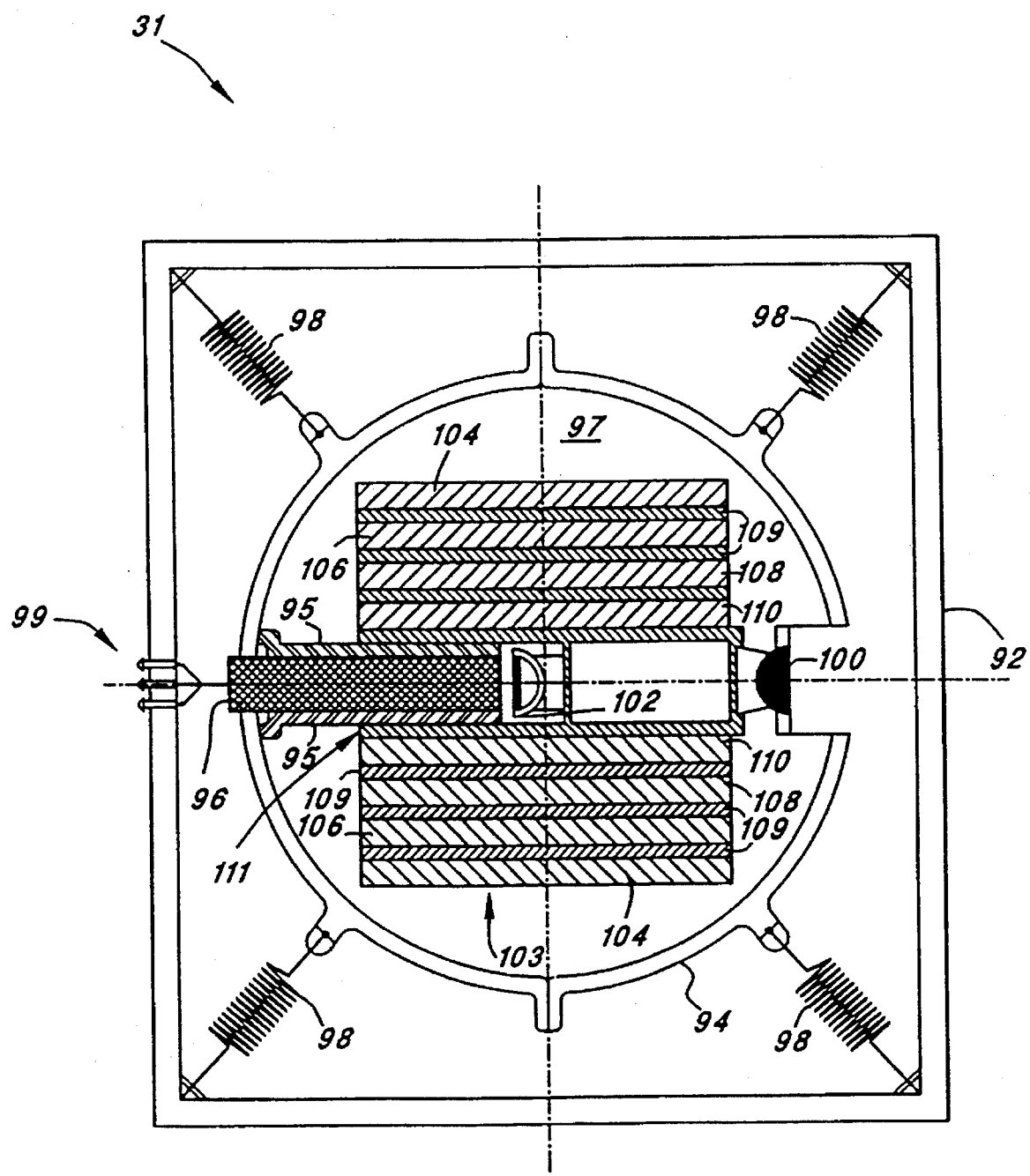
FIG. 8 depicts a schematic cutaway view of a modular EMB of a type that may be used with the present invention.

Referring next to FIG. 8, a schematic cutaway view of a modular EMB 31 of a type that may be used with the present invention is illustrated. An EMB module 31 of the type shown in FIG. 8 is described more thoroughly in Post et al., "A High-Efficiency Electromechanical Battery,", *Proceedings of the IEEE*, vol. 81, No. 3, pp. 462–474 (March 1993). Basically, the EMB module 31 includes a rotor 103 mounted for rotation on magnetic bearings 100 and 102 within a sealed vacuum chamber 97. The sealed vacuum chamber 97 is defined by thin stainless steel walls 94, reinforced with fiber composite, and a glass ceramic sleeve 95. The entire vacuum chamber 97 is then mounted inside of a containment vessel 92 made of highly impact-resistant material, such as three-dimensional fiber composite. Appropriate gimbal mounts 98 (represented as springs) are used to mount the vacuum chamber 97 within the vessel 92. Three-phase, stationary, generator windings 96 are mounted outside of the vacuum chamber 97, between the thin walls 95 that define a narrow neck portion of the vacuum chamber. Each winding terminates at one of three terminals 99.

The rotor 103 is made from concentric rotating cylinders 104, 106, 108 and 110. The concentric cylinders are made from thin walls (10% of the radius) to prevent delamination, and are separated by an elastic material 109. A magnet array 111 is placed on the inside of the inner concentric rotor cylinder 110 to create a rotating dipole magnetic field. The rotor 103 rotates at a velocity of the order to 10,000 rads/s, and allows each EMB module to produce about 1 kW-h of energy.

Advantageously, the EMB module 31 stores more energy per unit mass or per unit volume than other known energy devices. This is because stored energy increases only linearly with the mass of the rotor (for a given geometry), but goes up as the square of its rotation speed. Since the rotor 103 is made of a light, strong material, it can be spun much faster than heavy strong material (commonly used in conventional mechanical flywheels) before centrifugal forces threaten to break it up. The result is that the EMB can store much more energy, and more safely, than has previously been possible.

Composite materials based on graphite make it possible to build the EMB with a specific energy of about 150 Wh/kg, and a specific power that is orders of magnitude greater than anything achievable by an electrochemical battery or even an internal combustion engine. As indicated previously, the EMB can deliver a specific power 5,000 to 10,000 W/kg.

To keep the EMB from running down, the rotor 103, as indicated, runs on magnetic bearings 100 and 102 in the vacuum chamber 97, realized, e.g., using permanent magnets made from Nd-Fe-B. Such bearings offer the added advantage of extending the EMB's life since there is no mechanical contact, and hence no wear, with this mode of suspension. As a result, the sealed EMB, has an extremely long lifetime, and should outlast the vehicle in which it is carried.

The vacuum chamber 97 is evacuated to a pressure of $10^{-3}$ to $10^{-4}$ pascals. To achieve and maintain a vacuum of that pressure, it is important that the rotor materials minimize vacuum outgassing, and that other materials employ modern getter alloys.

In order to assure safety, which is always a concern any time a great deal of energy is stored in a small volume, the rotor materials are selected and designed to fail by disintegrating into a mass of fairly benign fluff or "cotton candy". In contrast, massive steel rotors, such as are used in mechanical flywheels, may fail in spectacular fashion, throwing off large chunks of shrapnel. The vessel 92, also made of a three-dimensional composite, is able to readily contain any such disintegrating mass by incorporating into its design high-strength fibers that run in all three directions. With such construction, any cracks that get started in the housing are not able to propagate.

Advantageously, the EMB is ironless. This feature not only keeps the weight low, but prevents hysteresis losses common in iron systems. Moreover, since inductances of the multi-phase windings are extremely low (with no iron present), and since rotation speeds are high, unusually high peak power outputs are achievable, with stator copper losses that can readily be handled by conventional means (air or liquid cooling).

Figure 9A:
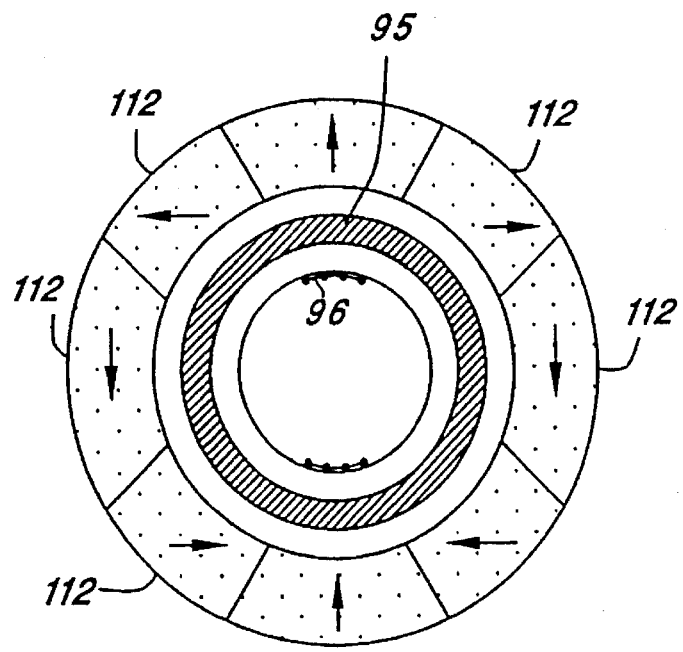
FIG. 9A illustrates an end view of a Halbach array of a type that may be used with the EMB module of FIG. 8.
Figure 9B:
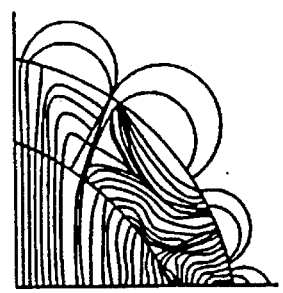
FIG. 9B depicts the calculated field lines for a quadrant of the Halbach array of FIG. 9A.

A central feature of the EMB is the generator/motor design. A special array of permanent magnet bars 112 is mounted on the rotor at 109 (FIG. 8). An end view of such array, known as the Halbach array, is shown in FIG. 9A, with the arrows indicating the relative polarity of the bar magnets 112. The magnetic lines of force associated with one quadrant of such array are shown in FIG. 9B. Of significance is the uniformity of the interior field, and its near cancellation outside of the array. Using Nd-Fe-B magnets, having a $B_r$ equal to 1.25 Tesla, dipole fields of the order 0.5 T can be readily obtained.

A typical EMB module of the type shown in FIGS. 8, 9A and 9B, provides the following operating parameters:

| | |
|---|---|
| Rotation speed: | 200,000 rpm |
| Magnetic field of Halbach Array: | 0.5 T |
| Length & Width of windings: | 0.8 m × .04 m |
| Number of turns: | 10 |
| Output voltage (3-phase): | 240 V rms |

It is to be emphasized that the EMB is the preferred energy storage device for use with the RPEV of the present invention because the EMB offers specific power and specific energy that makes it a viable energy source for an electric vehicle. As other alternative energy sources are developed, offering the same of similar performance relative to their specific power and specific energy, such alternative energy sources may also be used with the invention.

Figure 10:
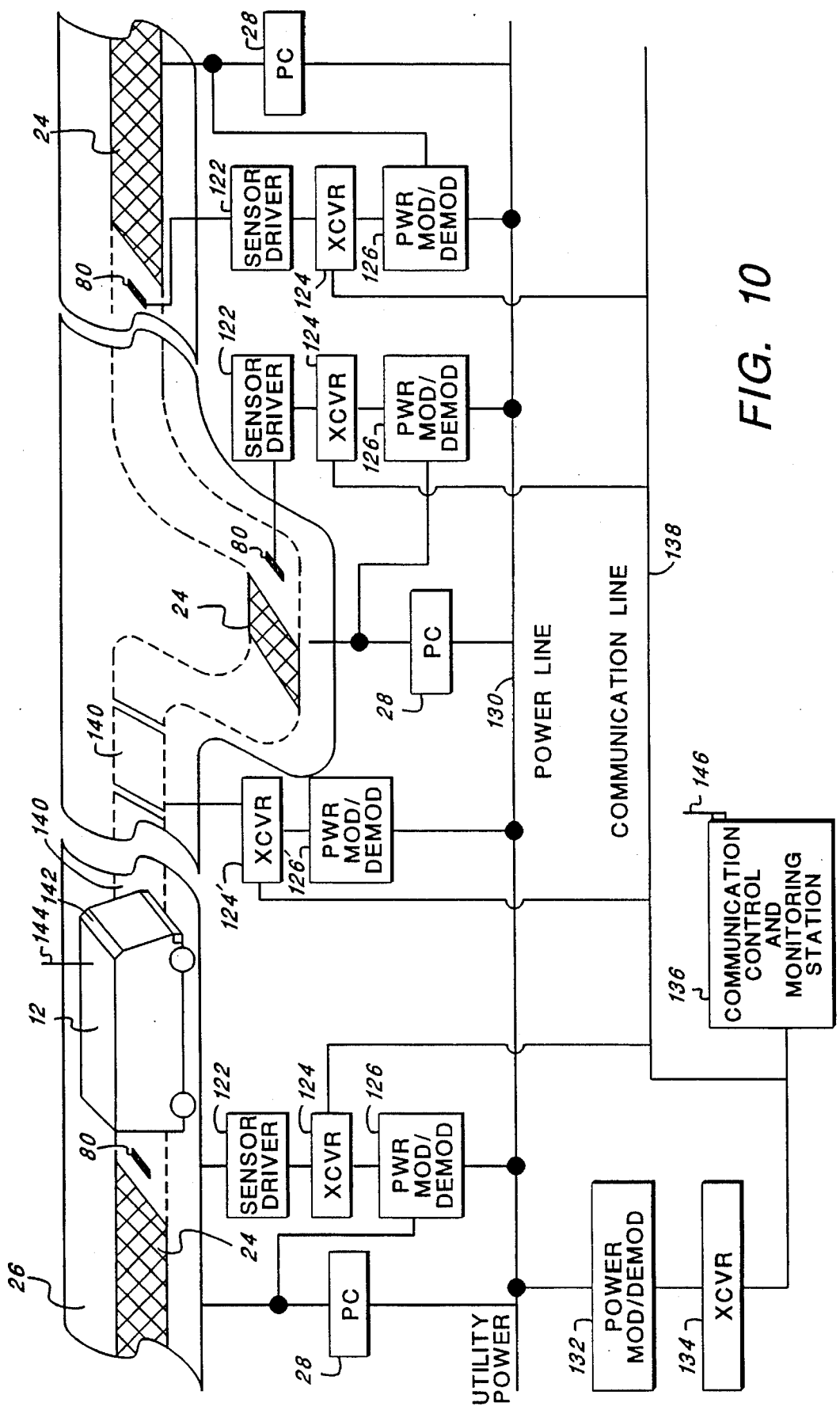
FIG. 10 schematically illustrates the various types of communication channels that may be used with the RPEV system of the present invention.

Referring next to FIG. 10, the communication channel provided as part of the RPEV system will be described. It is noted that several different types of communication channels are illustrated in FIG. 10, any one, or any combination of which, may be used with the invention. Hence, not all of the elements shown in FIG. 10 are needed for a given type of communication channel, but all such elements are nonetheless shown in FIG. 10 in order to reduce the number of figures that might otherwise be needed.

A first type of communication channel useable with the invention is used to broadcast roadway conditions to the RPEV before the RPEV encounters such conditions. Such an early roadway-condition warning system includes a plurality of roadway sensors 80 that are selectively positioned along the roadway 26, e.g., at the same locations where the charging pads 24 (also referred to as the roadway power transmission modules) are located. Typically, such roadway sensors will be located at least 300 m apart, and may be much farther apart, e.g., 1 to 5 km. The roadway sensors 80 detect the condition of the surface of the roadway 26, and other environmental parameters of interest. Typically, the sensors 80 sense at least whether there is any moisture or ice on the roadway surface, and may also sense the temperature of the roadway surface.

Each roadway sensor 80 is connected to an appropriate sensor driver circuit 122 that provides the sensor with whatever electrical signals it needs to perform its sensing function. For a moisture/temperature detector, such signals typically include just a current pulse of a few ma. The sensor driver circuit 122, after determining the measured parameter, encodes this information to create a sensor signal, or sensor word. The sensor word, in addition to the measurement of the moisture/temperature, also includes an identification number to identify the particular sensor 80 from which the sensor signal originated. Alternatively, the sensor signal may be transmitted in a time-division multiplex scheme that uniquely identifies the sensor from which it originated. The sensor word is provided to a transceiver (xcvr) circuit 124. The roadway sensor 80 and corresponding sensor drive circuit 122 are of conventional design.

The transceiver circuit, for this application, functions as a transmitter and provides the sensor word to a power modulator/demodulator circuit 126. The power modulator/demodulator circuit 126 is coupled to the main power line 130 that provides the primary power to the power conditioners 28 and to the output of the power conditioner (PC) 28 that provides the 1-phase, 3000 Hz (nominal), signal to the charging pad 24. The information signal is superimposed with the power signal on the power line, or is otherwise merged with the power signal, so that the power line conductor passes both the information signal and the power signal. The manner of superimposing an information signal on a power signal, or modulating a power signal with an information signal, is known in the art. (See e.g., the security system art, where the ac power lines of a protected structure are also used to interconnect individual sensors with a central monitoring device.)

The main power line 130 thus functions as the medium, or communications channel, through which sensor signals may be transmitted from one power modulator/demodulator 126 to another. Each power modulator/demodulator 126 further couples the signals stripped off of the main power line to the respective charging pads so that such signals may be coupled into each RPEV as it travels over the respective pad 24. Moreover, as seen in FIG. 10, an additional power modulator/demodulator circuit 132, and a corresponding transceiver circuit 134, couple the sensor signals, and any other signals that may be on the communication channel (the main power line 130) to a communication control and monitoring station 136. The station 136 thus functions as a communication center for the RPEV system.

The RPEV 12, upon being charged with a power signal through the charging pad, also receives the sensor signals from the various sensors along the roadway 26. Once received, the sensor signals are processed (using the onboard processor 56) and acted upon. Typically, the information contained within a sensor signal is at least displayed, e.g., "sensor No. xx, located at point yy on the roadway, reports ice and/or moisture," and may also be factored into any automatic controls that may come into play when that portion of the highway is reached.

An additional type of communication channel that may be used with the invention is as described above, but further uses an existing or dedicated communication line 138 to tie the various transceiver circuits 124 together and to the communication control and monitoring station 136. Existing communication lines that may be used as the line 138 include telephone lines, cable TV lines, and the like. Also, for many applications of the RPEV system, where a relatively small area is serviced by the RPEV's, a dedicated coax communication line, installed between each power transceiver unit 124, would be economically viable to serve the function of the communication line 138.

Still referring to FIG. 10, a further type of communication channel may be established by embedding into the roadway 26 a wire loop 140 that effectively serves as an antenna to couple signals to the RPEV 12 at all locations along the roadway where the charging pads 24 are not located, e.g., at all non-electrified roadway sections. (At electrified locations, signals may be coupled to the RPEV through the charging pads, as described above.) Such loops 140 may be coupled to the same input power lines that charge the respective charging pads. In those locations where there is not a charging pad, e.g., where the wire loop is some distance from a charging pad, a separate transceiver 124' may be connected directly to the wire loop 140. Such transceiver 124' is then coupled to a power modulator/demodulator circuit 126' (when used), or to the communication line 138.

In operation, the availability of the wire loop 140 allows continuous communications to be had with the RPEV regardless of where it may be located along the network of roadways and highways. Hence, telephone, video and other signals may be readily accessible within the RPEV as it travels along a route having the wire loop 140.

The wire loop 140 may be installed or embedded within the roadway 26 without great expense. In most instances, all that is required is to grind, cut, or etch a small groove or channel in the roadway surface, lay down a suitable conductor within the groove or surface, and cover or seal the groove or channel with tar, pavement, or other suitable filler.

As a further type of communication channel, the RPEV 12 may also carry onboard a conventional rf transceiver 142 that, through a suitable antenna 144, is in telecommunicative contact with the communication control and monitoring station 136, which also has an antenna 146. Such rf telecommunication channels are well known and used in the art, but suffer from degraded reception and transmission in areas where there are mountains, buildings, or other structures or obstacles that interfere with the rf channel.

Other types of communication channels and transportation features that may be used with the RPEV system of the present invention are as described, e.g., in "Transportation", *IEEE Spectrum*, pp. 68–71 (January 1993), incorporated herein by reference.

Regardless of the type of communication channel that is employed, it is important to note that such communication channel, or channels, may be used to both send and receive information to and from the RPEV. Thus, for example, a particular RPEV may periodically send an identification signal that identifies that RPEV, and the location whereat the signal is received along the communication channel thus provides a way for the communications center 136 to "track" the RPEV. Such a "tracking" feature is of significant benefit for fleet management purposes. Further, with the ability to send signals to and receive signals from the RPEV, it is possible to completely control its operation from the communications center 136, thereby obviating the need to have a driver onboard the RPEV where the RPEV's are used, e.g., as a mass transit type of system, or as a cargo delivery system.

Figure 11:
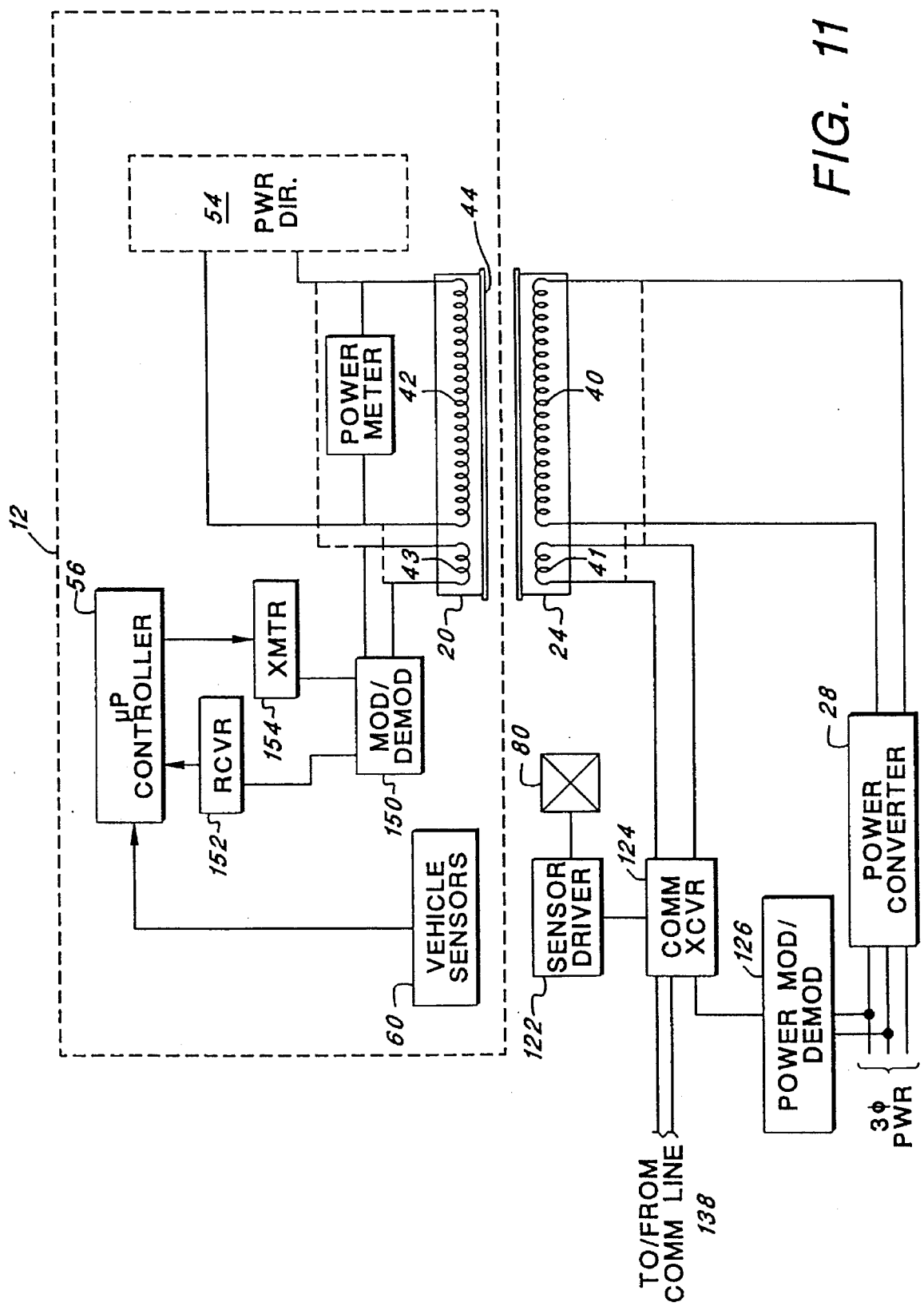
FIG. 11 shows a block diagram of the communication channel elements of the invention.

Referring to FIG. 11, a functional block diagram is shown of one manner in which the communication channel interface with the RPEV 12 may be realized. Many of the elements shown in FIG. 11 are the same as those of FIG. 2, although many of the elements of FIG. 2 have been omitted from FIG. 11 for clarity. In FIG. 11, the embedded coil 40 and the onboard coil 42 are shown, as has been previously described. Coil 40 inductively couples the 1-phase power signal to the onboard coil 42. Such power signal may be modulated with the information signal that is to be transferred to the RPEV. Thus, when the power signal is received within the RPEV, it is demodulated (stripped away from the power signal) using an onboard modulator/demodulator circuit 150, then processed as needed (e.g., converted to an appropriate form) by a receiver circuit 152, and presented to the onboard microprocessor controller 56. Thus, as described above, an information signal may be sent to the RPEV.

When an information signal is to be received from the RPEV, such signal originates in the onboard microprocessor controller 56 and is presented to an appropriate onboard transmitter circuit 154, which may be of conventional design, that converts the signal to an appropriate form for transmission. The signal is then presented to the onboard modulator/demodulator circuit 150, where it is modulated in an appropriate manner and presented to coil 43. Coil 43 inductively couples the signal to embedded coil 41. Coil 41 then presents the signal to communication receiver 124. Communication receiver 124 then couples the signal directly to the communication line 138, or to the power modulator/demodulator 126, which couples it to the main power line 130.

While separate coils 40 and 41 are shown in FIG. 11 to perform the sending and receiving functions, respectively, at the embedded location, and corresponding coils 43 and 44 are shown that perform the sending and receiving functions onboard the RPEV, in practice the coils 40 and 41 may be the same coil, as may the coils 43 and 44.

Figure 12:
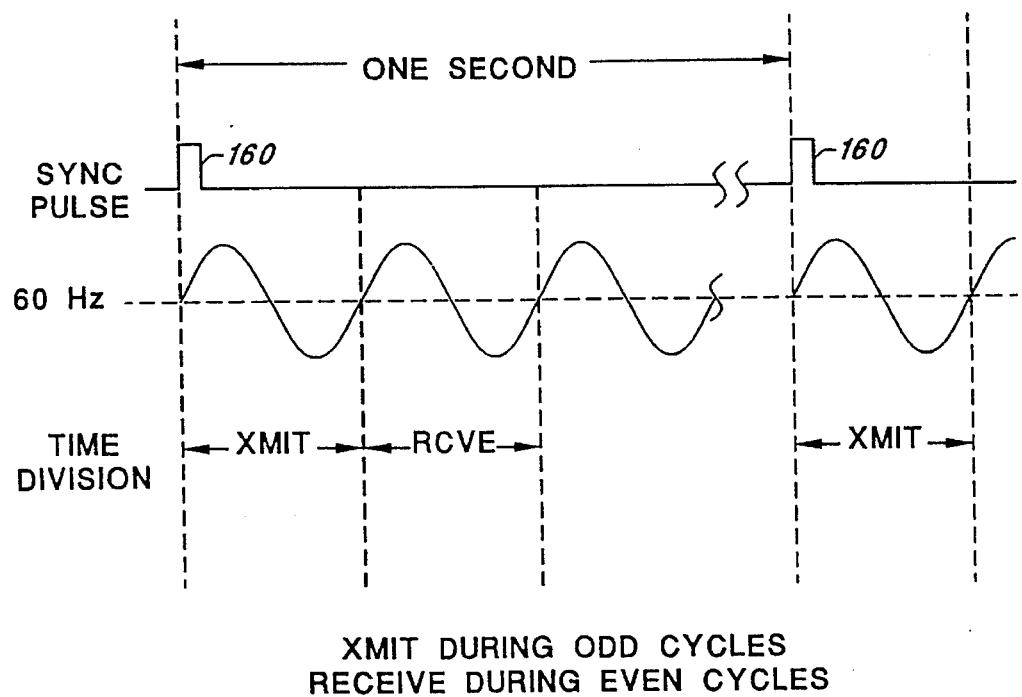
FIG. 12 depicts one type of time-division multiplex scheme that may be used by the communication channel of the invention to transfer data from a plurality of sensors.

FIG. 12 illustrates one manner in which the sensor signals, obtained from all the various roadway sensors 80 that may be located along the length of the roadway 26, and other signals transmitted to and from the RPEV over the communication channel, are multiplexed so that the signals are not confused and intermingled with each other. For example, with respect to the roadway sensor signals, it is important that a given RPEV be able to determine which sensor signal originated with which sensor (and hence from which roadway location the sensor signal originates). The multiplex scheme depicted in FIG. 12 is that of a time division multiplex scheme. In accordance with such scheme, all that is required to perform the multiplexing function is to assign a specific time when a certain identified signal is to be sent or received. Such time division is easily accomplished simply by counting cycles of the power signal. As seen in FIG. 12, a synchronization pulse 160 is generated by the utility company, or otherwise superimposed on the main power signal, every second. Hence, for a power signal that operates at a frequency of 60 Hz, there are exactly 60 cycles of the ac power signal between sync pulses, each having a duration of 16.7 msec. Each of these cycles is assigned a certain function depending upon its location relative to the sync pulse 160. Thus, for example, the odd cycles following the sync pulse, i.e., the 1st, 3d, 5th, 7th, . . . cycles are assigned for transmission; and the even cycles following the sync pulse, i.e., the 2nd, 4th, 6th, 8th, . . . cycles are assigned for receiving. The first 12 cycles may be reserved for general communication functions in this manner. The remaining 48 cycles may be assigned to 48 respective sensors, with a first sensor (at a first known location on the roadway) inserting (superimposing) its sensor signal on the power signal during the 13th power cycle, a second sensor (at a second known location on the roadway) inserting its sensor signal on the power signal during the 14th power cycle, and so on. If there are more than 48 sensors to be monitored, then the multiplexing capacity may be increased by either increasing the duration between the sync pulses, e.g., to 2 sec., and/or counting half cycles of the power signal instead of full cycles.

Figure 14:
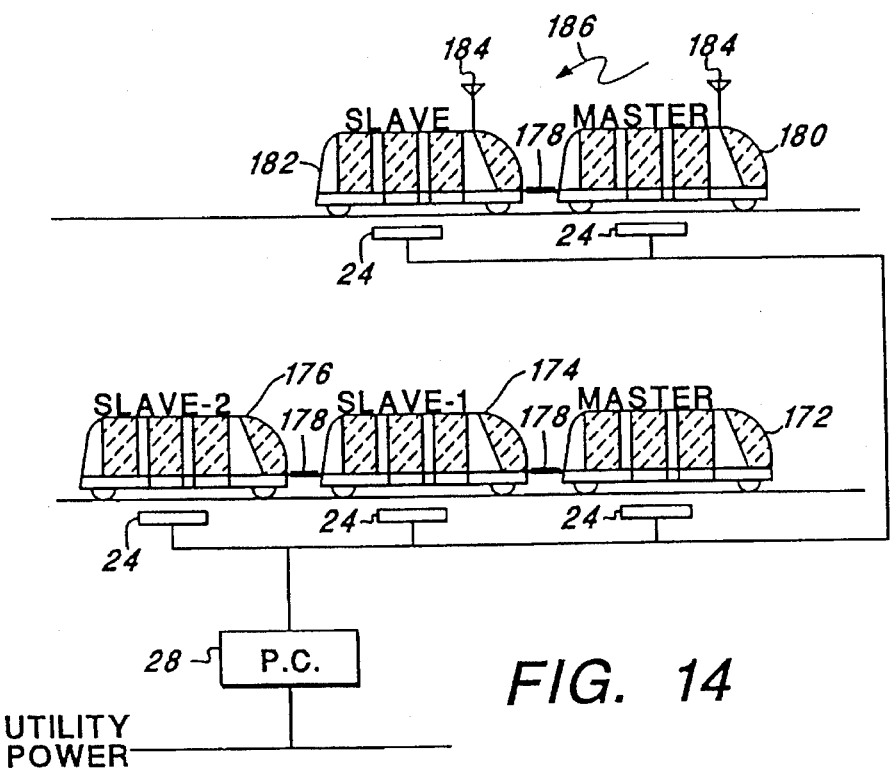
FIG. 14 illustrates how one or more follower (slave) RPEV's may be electronically linked or coupled to a leader (master) RPEV in order to form a "train" of RPEV's.

Referring next to FIG. 14, the concept of electronically linking a plurality of RPEV's together in order to form a "train" of such vehicles is illustrated. Advantageously, the RPEV may be totally controlled electronically, as a robot, because its controls are all amenable to simple commands, e.g., drive forward at a certain speed, steer left or right, brake, etc. Nonetheless, because the RPEV is constantly in traffic, and not all circumstances can be foreseen, it is usually desirable to have a real person onboard that can operate the vehicle, even though such person may, on occasion, place the vehicle in an "auto pilot" mode. Hence, by electronically linking more than one RPEV together, a lead RPEV, termed the "master" on which a live person operator is located, may generate the electronic signals that are used to control one or more following RPEV's, termed the "slave".

The master/slave RPEV system is depicted in FIG. 14. In the bottom portion of FIG. 14, a master RPEV 172 leads two slave RPEV's 174 and 176. The coupling of the electronic control signals from the master 172 to the slaves 174 and 176 is by way of a flexible, coiled cable 178 that simply plugs into both RPEV's. Such cable bears no mechanical tension as each RPEV has its own source of power, and is independently charged through the network of charging pads 24.

As shown in the top portion of FIG. 14, a master RPEV 180 leads a slave RPEV 182 with the electronic coupling being provided by a flexible, coiled cable 178, as previously described, and with an rf link, represented in the figure by the antennas 184 and wavy arrow 186. The rf link is used to provide a redundant link (used to provide added safety) through which the proper command signals may be received by the slave vehicle.

Figure 15:
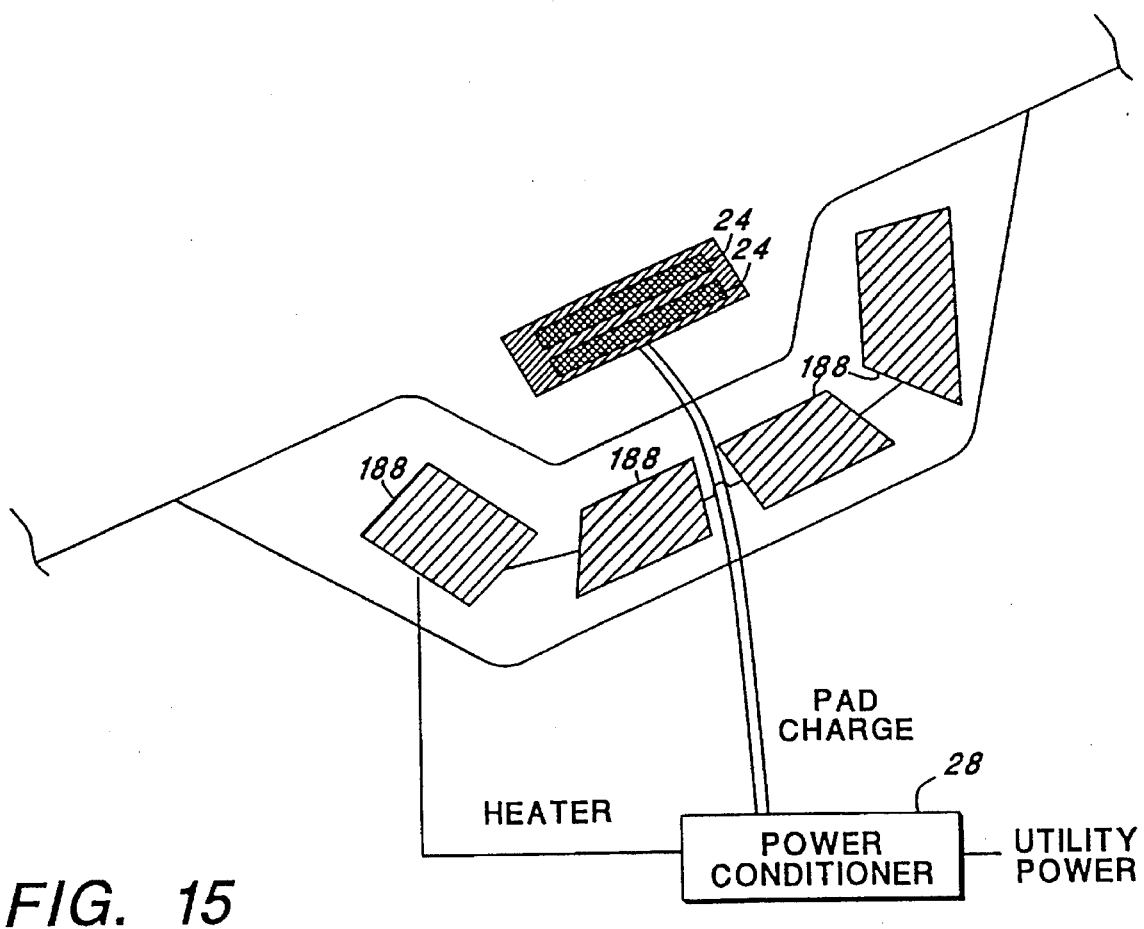
FIG. 15 schematically illustrates how the power converter used to electrify a charging pad at a passenger loading/unloading zone may also be used to power a plurality of heating coils embedded in the surface structure of the passenger loading/unloading area in order to prevent the formation of ice or the accumulation of snow.

Turning next to FIG. 15, a further enhancement of the RPEV system of the present invention is schematically depicted. In FIG. 15, the charging pad 24 is located at a curbside designed for a passenger loading/unloading zone. The charging pad 24 is powered from a power conditioner 28 as previously described. Also powered by the power conditioner 28 are heating coil pads 188. The heating coil pads 188 are embedded in the sidewalk, or other surface material, that surrounds the passenger loading/unloading zone. The purpose of the heating coil pads 188 is simply to melt any ice or snow that might otherwise accumulate at the loading/unloading zone, thereby providing a further convenience and measure of safety for the passengers. The heating coils 188 are not heavy consumers of electrical power, but operate using only about 200–400 W each. Thermostatic control of the heater coils may be used to maintain the surface temperature around the coils to within a desirable range.

Figure 16:
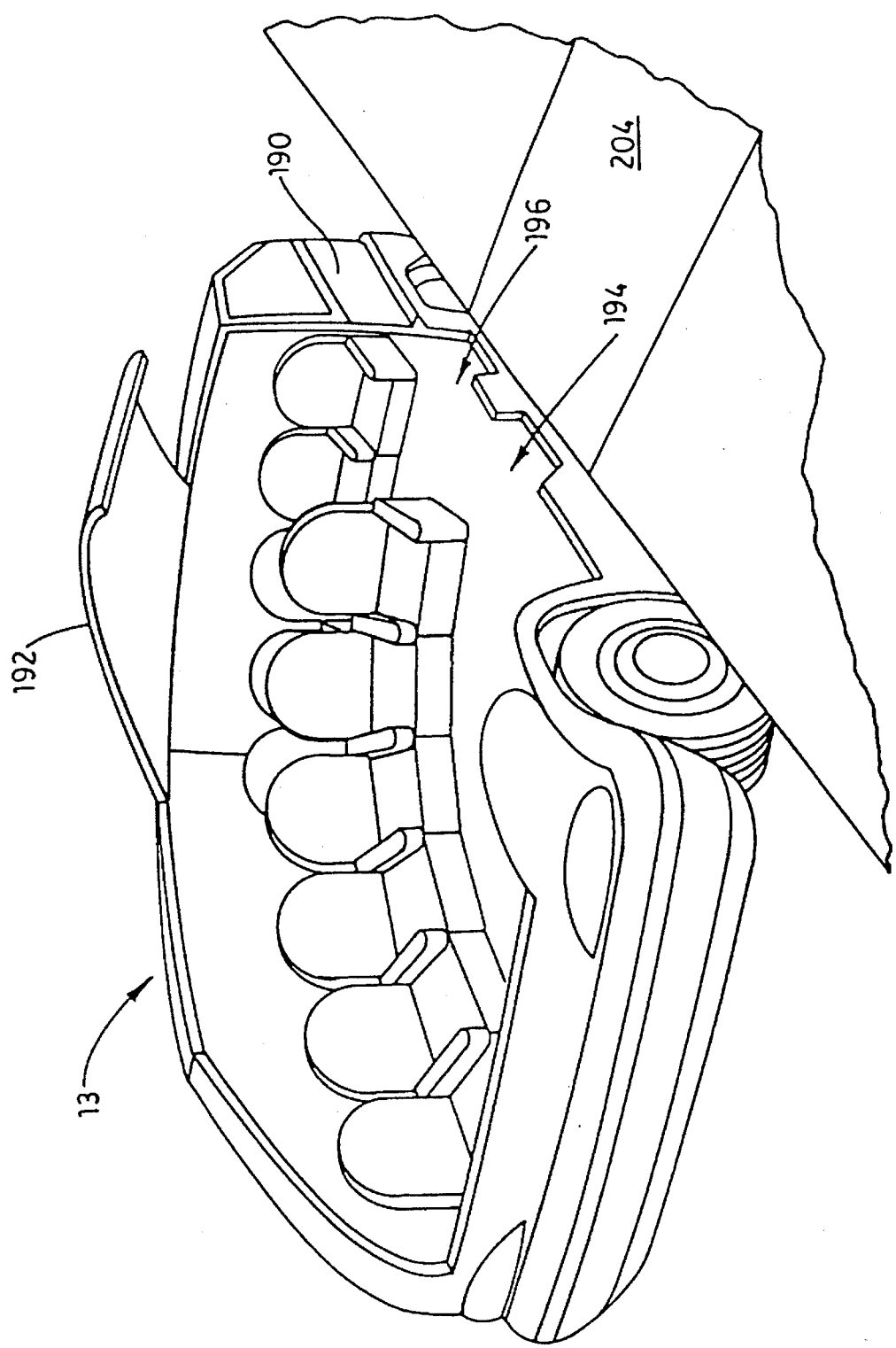
FIG. 16 is a cutaway view of the passenger compartment of an ergonomically-designed multiple occupancy vehicle (MOV) made in accordance with the present invention.
Figure 17:
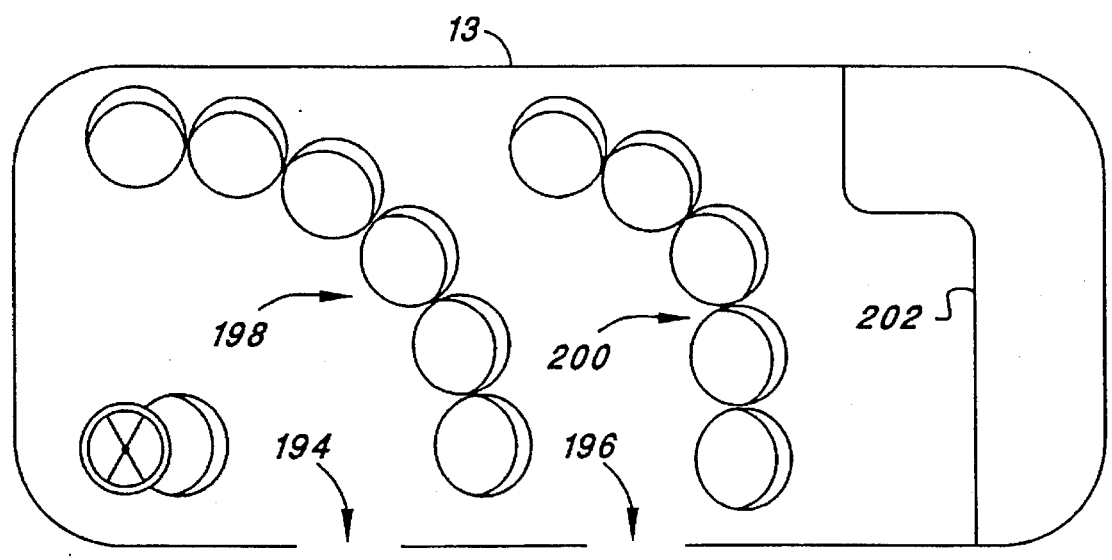
FIG. 17 shows a plan view of the passenger seating arrangement in the MOV of FIG. 16.

A further important feature achievable with the RPEV system of the present invention is the ergonomic design of the passenger compartment of a multiple occupancy vehicle (MOV) that includes the RPEV features previously described. An MOV 13 is shown, partially cutaway, in FIG. 16. The MOV 13 is a unique, low-floor automobile-sized vehicle. That which is shown in FIG. 16 is for an all-seated version for 15–17 passengers, plus an operator. The plan view of the seating arrangement for such MOV is shown in FIG. 17. A standing version of the MOV may also be used. The MOV is adapted for traveling on the electrified roadway described herein. It is charged at stops using a demand responsive charging mode, also as previously described. It is an all electric vehicle, and utilizes electronic guidance at pullouts to assure good alignment between the coupling coils. It may be coupled electronically with other vehicles, as described in connection with FIG. 14 above.

The MOV 13 has a door system that allows easy ingress and egress with sufficient head room to avoid bumping one's head. For example, as seen in FIG. 16, the door system includes two components, a sliding door 190 and an upper door 192. When open, the sliding door exposes two entries 194 and 196, and the upper door 192 raises to provide increased head room. The entry 194 allows passengers access to a front curved row of six seats 198, seen best in the plan view of the MOV in FIG. 17. The entry 196 allows passengers access to a second curved row of five seats 200, and a rear L-shaped bench 202. The rear bench 202 can seat 4–6 adults comfortably.

An important aspect of the MOV 13 shown in FIGS. 16 and 17 is a low floor, which facilitates platform loading (no stepping down or stepping up is required). Platform loading is a big advantage to the handicapped, and makes loading/unloading easier for everyone.

As described above, it is thus seen that the present invention provides an efficient, viable, safe, roadway-powered all electric vehicle that uses, with only minor modification, the existing network of highways, roadways, and/or garaging/parking facilitates that are already in place to service ICE vehicles.

Further, it is seen that the RPEV system disclosed provides a zero-emission electric vehicle system wherein the RPEV's of the system may be recharged while such RPEV's are in operation within the system. Hence, the RPEV's need not be taken out of service from the system in order to be recharged, as is common with prior art battery-storage type EV's.

Moreover, as seen from the above description, numerous additional features may be used to enhance the RPEV system, such as the inclusion of: (1) an onboard power meter; (2) a wide bandwidth communication channel to allow information signals to be sent to, and received from, the RPEV while it is in use; (3) automated garaging that couples power to the RPEV for both replenishing the onboard energy source and to bring the interior climate of the vehicle to a comfortable level before the driver and/or passengers get in; (4) electronic coupling between "master" and "salve" RPEV's in order to increase passenger capacity; (5) inductive heating coils at a passenger loading/unloading zone in order to increase passenger safety; and (6) an ergonomically designed passenger compartment in which passengers may travel safely and comfortably.

While the invention herein disclosed has been described by means of specific embodiments and applications thereof, numerous modifications and variations could be made thereto by those skilled in the art without departing from the scope of the invention set forth in the claims.

What is claimed is:

1. A roadway-powered electric vehicle comprising:
   a vehicle frame supported by front and rear suspension systems, including front and rear wheels;
   an onboard power receiving module mounted on an underneath side of said vehicle frame that receives electrical power coupled thereto from a roadway power transmitting module embedded in a roadway over which the electric vehicle travels;
   an onboard energy storage means for storing and delivering electrical energy;
   an electric drive means coupled to at least one of said front or rear suspension systems for driving at least one of said front and rear wheels;
   an onboard power controller means for receiving electrical power from said onboard power receiving module and directing it to said energy storage means, and for selectively delivering electrical energy from said energy storage means to said electric drive means in order to provide operating power for said electric vehicle; and
   an onboard power meter electrically connected to the onboard power receiving module to monitor the electrical power received through said onboard power receiving module from said roadway power transmitting module, said onboard power meter thereby providing a measure of the amount of electrical power that has been coupled to the electric vehicle.

2. The electric vehicle as set forth in claim 1 wherein said electric vehicle comprises a multiple occupancy vehicle (MOV) adapted for transporting at least 15 passengers, and wherein said MOV includes a passenger compartment that includes:
   a door system that includes a side door that slides open and an upper door that swings up, thereby increasing the vertical entry space afforded a passenger entering or exiting said MOV through said door system; and
   a seating arrangement that includes two rows of chairs set in a curved pattern.

3. The electric vehicle as set forth in claim 1 further including demodulation means coupled to said onboard power receiving module for demodulation of a communication signal included with the electrical power received by the onboard power receiving module, said communication signal being directed to said onboard power controller means to provide information to said onboard power controller means.

4. The electric vehicle as set forth in claim 3 wherein there are included a plurality of roadway sensors in the roadway over which the electric vehicle travels that monitor whether the roadway has ice or moisture thereon, said roadway sensors being spaced apart from each other by at least approximately 300 m, each of said sensors generating a sensor signal that identifies each sensor and provides an indication of whether ice or moisture is present at such identified sensor, said sensor signal being coupled to the roadway power transmitting module and being a part of the communication signal that is transmitted to the electric vehicle with the electrical power received by the onboard power receiving module, whereby each electric vehicle receives an indication of whether ice or moisture is present at a location on the roadway corresponding to the identified sensor.

5. The electric vehicle as set forth in claim 4 wherein said electric vehicle includes modulation means for modulating an electric vehicle identification signal that identifies a particular electric vehicle, and onboard transmitting means for transmitting the electric vehicle identification signal to a numbered roadway receiver located by each of said roadway power transmitting modules, each of said roadway receivers being linked to a communication station, wherein the communication station can determine when the particular electric vehicle is located near the numbered roadway receiver.

6. The electric vehicle as set forth in claim 1 wherein said electric vehicle is a first electric vehicle and wherein onboard power controller means includes generating means for generating a set of control signals that control how said first electric vehicle is being operated, and coupling means for coupling said set of control signals to a second electric vehicle, said second electric vehicle including means for electronically responding to said set of control signals so that the second RPEV is operated as controlled by said set of control signals, whereby said second electric vehicle follows said first electric vehicle.

7. The electric vehicle as set forth in claim 6 wherein said coupling means comprises a flexible cable that is connected between said first electric vehicle and said second electric vehicle through which said set of control signals may be transferred from said first electric vehicle to said second electric vehicle.

8. The electric vehicle as set forth in claim 6 wherein said coupling means includes an rf transmitter carried onboard said first electric vehicle through which said set of control signals may be transmitted, and wherein said second electric vehicle includes an onboard receiver through which the set of control signals transmitted from said first electric vehicle may be received.

9. A roadway-powered electric vehicle system comprising:
   a network of highways and roadways that have been electrified with a multiplicity of roadway power transmitting modules embedded in the highways and roadways at select locations, each of the roadway power transmitting modules being connected to receive power from an electrical utility;

a plurality of electric vehicles for traversing the network of highways and roadways using electrical power coupled to the electric vehicles from the electrified highways and roadways as the electric vehicles travel over the locations of the highways and roadways that have been electrified;

communication means for establishing a communication channel with each of the plurality of electric vehicles that transfers communication signals to and from the electric vehicles through the electrified highways and roadways; and an onboard power meter connected to monitor the amount of electrical power coupled from the electrified highways and roadways.

10. The electric vehicle system as set forth in claim 9 wherein the onboard power meter is coupled to said communication means and the amount of electrical power monitored by said onboard power meter may be included within the communication signals transferred through said communication channel.

11. The electric vehicle system as set forth in claim 9 wherein said communication channel comprises power lines used by the electrical utility to distribute electrical power to the roadway power transmitting modules and elsewhere.

12. The electric vehicle system as set forth in claim 9 wherein said communication channel comprises commercial communication lines provided by telecommunication providers.

13. The electric vehicle system as set forth in claim 9 wherein said communication channel comprises dedicated wide bandwidth communication lines installed to connect each of said roadway power transmitting modules with a central monitoring location.

14. The electric vehicle system as set forth in claim 9 wherein said communication channel further includes establishing means embedded in highways and roadways for establishing a communication link with each of the plurality of electric vehicles when said electric vehicle is over non-electrified portions of said highways and roadways, whereby continuous communications may be made with said electric vehicle as it traverses said network of highways and roadways, whether on electrified or non-electrified portions of the network of highways and roadways.

15. The electric vehicle system as set forth in claim 9 wherein said roadway power transmitting modules receive 3-phase, 50/60 Hz electrical power, and wherein a power conditioner converts the 3-phase, 50/60 Hz electrical power to a 1-phase, 2500–3500 Hz electrical power for use by said roadway power transmitting modules, said electric vehicle system further comprising heater means embedded in a surface structure along the side of the highway or roadway adjacent selected ones of said roadway power transmitting modules, said heater means being powered by electrical power from the power conditioner for preventing the formation of ice and the accumulation of snow at the location of said heater means.

16. A roadway-powered electric vehicle system comprising:

a network of highways and roadways that have been electrified with a multiplicity of roadway power transmission modules embedded in the highways and roadways at select locations, each of the roadway power transmission modules being connected to receive power from an electrical utility, the network of highways and roadways including a parking/garaging location, wherein said parking/garaging location is electrified with at least one of the multiplicity of power transmission modules;

a plurality of electric vehicles for traversing the network of highways and roadways using electrical power coupled to the electric vehicles from the electrified highways and roadways as the electric vehicles travel over the locations of the highways and roadways that have been electrified;

communication means for establishing a communication channel with each of the plurality of electric vehicles that transfers communication signals to and from the electric vehicles through the electrified highways and roadways; and a charging control circuit coupled to the at least one of the multiplicity of roadway power transmission modules, said charging control circuit including means for sensing the presence of a parked electric vehicle at the parking/garaging location, and coupling means for automatically coupling power to the parked electric vehicle at preselected times during the day.

17. The electric vehicle system as set forth in claim 16 wherein the charging control circuit at the parking/garaging location further includes mode means for coupling power to the parked electric vehicle in a first coupling mode that couples 200 W to 500 W of electrical power to the parked electric vehicle on command, and which coupled electrical power is used by the electric vehicle to bring the interior temperature of the electric vehicle to a comfortable level, and for coupling power to the parked electric vehicle in a second coupling mode that couples 6 kW to 10 kW of electrical power to the electric vehicle over a one to four hour time period at the preselected times, which coupled electrical power is used to replenish an onboard energy storage system of the parked electric vehicle.

18. The electric vehicle system as set forth in claim 17 wherein said charging control circuit further includes a communication receiver for receiving a command signal that automatically begins said first coupling mode, wherein an operator of the parked electric vehicle may selectively begin the first coupling mode to bring the interior temperature of the electric vehicle to a comfortable level.

* * * * *